United States Patent [19]

Mikamoto et al.

[11] Patent Number: 4,665,453
[45] Date of Patent: May 12, 1987

[54] FLOPPY DISC RECORDING AND/OR REPRODUCING APPARATUS

[75] Inventors: Makoto Mikamoto, Isehara; Shinkichi Sasaki, Chofu; Hiroyuki Watanabe, Yokohama; Azuma Miyazawa, Hadano, all of Japan

[73] Assignee: Mitsumi Electric Co., Ltd., Japan

[21] Appl. No.: 603,837

[22] Filed: Apr. 25, 1984

[30] Foreign Application Priority Data

Apr. 26, 1983 [JP] Japan .............................. 58-62513[U]
Jul. 14, 1983 [JP] Japan ........................... 58-109937[U]
Nov. 26, 1983 [JP] Japan ........................... 58-182678[U]

[51] Int. Cl.[4] .......................................... G11B 23/06
[52] U.S. Cl. .................................. 360/96.6; 137/132; 242/198
[58] Field of Search ...................... 360/96.6, 137, 96.5, 360/95, 97, 132; 242/198

[56] References Cited

U.S. PATENT DOCUMENTS

| 4,050,087 | 9/1977 | Kishi | 360/96.6 |
| 4,068,851 | 1/1978 | Yamamura | 360/96.6 |
| 4,072,988 | 2/1978 | Sato et al. | 360/96.6 |
| 4,314,292 | 2/1982 | Umaba | 360/86 |
| 4,345,283 | 8/1982 | Maryschka | 360/96.6 |

FOREIGN PATENT DOCUMENTS

| 2725242 | 12/1977 | Fed. Rep. of Germany . |
| 3223651 | 1/1983 | Fed. Rep. of Germany . |
| 7139177 | 6/1972 | France . |
| 7802119 | 8/1979 | France . |
| 2060974 | 5/1981 | United Kingdom . |

Primary Examiner—A. Michael Chambers
Attorney, Agent, or Firm—Andrus, Sceales, Starke & Sawall

[57] ABSTRACT

A floppy disc recording and/or reproducing apparatus includes a driving shaft for rotationally driving a floppy disc, a cam body having a cam part, and a driving mechanism for rotating the driving shaft and the cam body independently of each other. A pair of guide parts are arranged on a single imaginary line and disposed on opposite sides of the driving shaft. A carriage has a head for recording and/or reproducing signals on and/or from the floppy disc which is rotated by the driving shaft. A pair of guided elements are located on the carriage, for linearly moving the carriage under guidance of the pair of guide parts. One of the pair of guided elements makes contact with the cam part of the cam body and is displaced as the cam body rotates, so as to move the carriage continuously.

24 Claims, 26 Drawing Figures

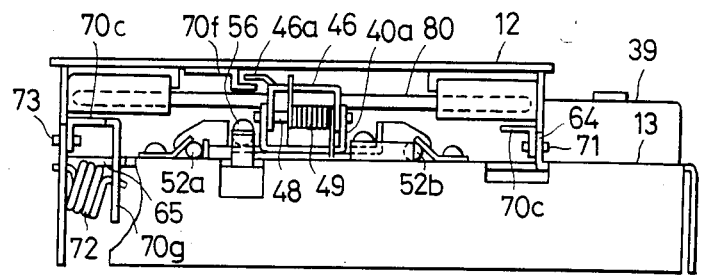
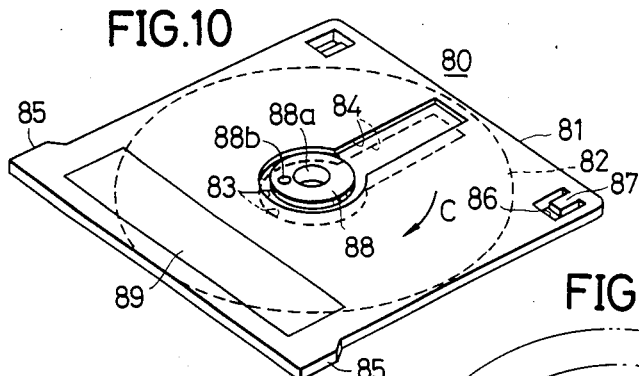
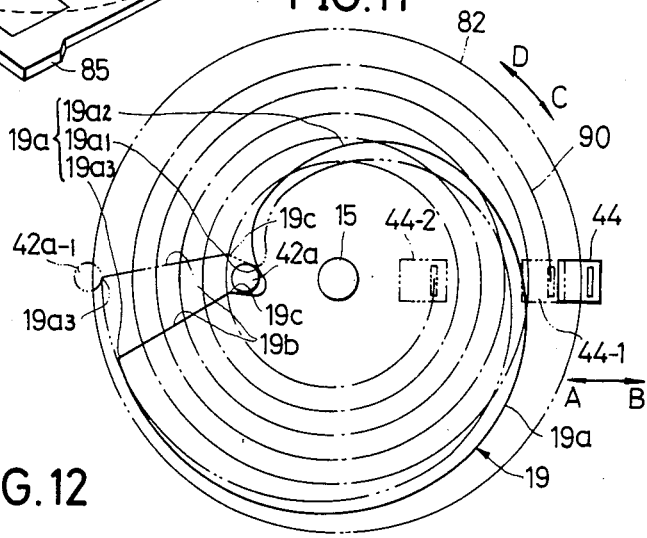
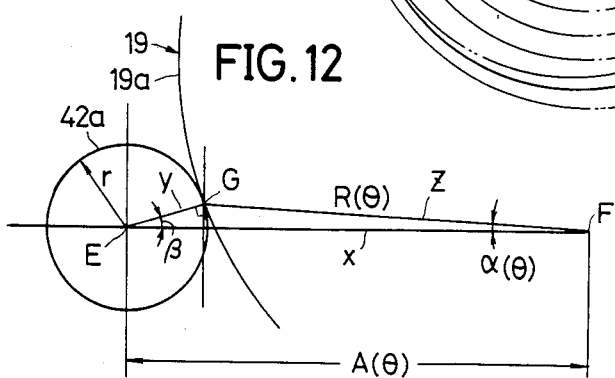

FLOPPY DISC RECORDING AND/OR REPRODUCING APPARATUS

BACKGROUND OF THE INVENTION

The present invention generally relates to recording and/or reproducing apparatuses for recording and/or reproducing signals on and/or from a floppy disc, and more particularly to a floppy disc recording and/or reproducing apparatus which records and/or reproduces signals on and/or from a spiral track on the floppy disc.

The conventional floppy disc recording and/or reproducing apparatus was designed to record and/or reproduce signals on and/or from concentric tracks on the floppy disc, by intermittently moving a magnetic head in a radial direction of the floppy disc. For this reason, it was necessary to provide two motors in the apparatus, that is, a motor for rotating the disc, and a motor for linearly and intermittently moving the magnetic head. As a result, the construction of the apparatus became complex, and the cost of the apparatus became high. Further, it was difficult to downsize the apparatus because of the complex construction.

In the conventional floppy disc recording and/or reproducing apparatus, it required a complex mechanism to accurately move the magnetic head in the radial direction of the disc. When a mechanism having a simple construction was employed instead of the complex mechanism, it was impossible to accurately move the magnetic head in the radial direction of the disc.

In addition, there was a conventional floppy disc recording and/or reproducing apparatus having a mechanism for displacing a floppy disc which is inserted into the apparatus to a predetermined recording and/or reproducing position, and for displacing the floppy disc back to the inserting position when the recording or reproduction is completed. However, such a mechanism had a complex construction. Especially when the floppy disc is compact in the range of 3.5 inches or less in diameter, for example, it was desirable to provide a mechanism for automatically pushing the floppy disc so as to project from the front of the apparatus when the recording or reproduction is completed, so that the operator can easily hold and extract the floppy disc out of the apparatus. However, the provision of such a mechanism made the construction of the apparatus even more complex.

SUMMARY OF THE INVENTION

Accordingly, it is a general object of the present invention to provide a novel and useful floppy disc recording and/or reproducing apparatus, in which the problems described heretofore have been eliminated.

Another and more specific object of the present invention is to provide a floppy disc recording and/or reproducing apparatus which is designed to rotate a floppy disc and move a magnetic head by a single motor. According to the apparatus of the present invention, the construction of the apparatus is simplified and the apparatus can be manufactured at a low cost.

Still another object of the present invention is to provide a floppy disc recording and/or reproducing apparatus in which a pair of guide rollers for guiding a carriage which supports a head which is moved in a radial direction of a floppy disc so as to record and/or reproduce signals, are arranged symmetrically to a center of rotation of the floppy disc. One of the guide rollers is pushed against one side of a corresponding guide groove, by a sliding contact force exerted by a head moving cam plate as the head moving cam plate rotates in one direction. The other guide roller is pushed against one side of a corresponding guide groove, by a sliding contact force exerted by the floppy disc through the head. According to the apparatus of the present invention, the distance between the pair of guide rollers, over the center of rotation of the floppy disc, can be set to a relatively large value. Hence, a sloping angle with which the carriage slides erroneously can be made small, and the sliding precision of the carriage can be improved. Further, because the pair of guide rollers are constantly pushed against respective sides of the corresponding guide grooves as the carriage moves, the operation of the carriage as it slides is stabilized. As a result, the sliding precision of the carriage is further improved, and the precision with which the head is moved is also improved.

A further object of the present invention is to provide a floppy disc recording and/or reproducing apparatus comprising a disc holder which is pivotally supported at one end thereof and rotated. When loading the floppy disc into the apparatus, the floppy disc is inserted into the disc holder, and the disc holder is rotated downwardly together with the floppy disc. When unloading the floppy disc from the apparatus, the disc holder is rotated upwardly together with the floppy disc. According to the apparatus of the present invention, the loading and unloading of the floppy disc with respect to the apparatus are facilitated. The apparatus according to the present invention is especially suited for playing a floppy disc which is accommodated within a compact rigid case.

Other objects and further features of the present invention will be apparent from the following detailed description when read in conjunction with the accompanying drawings.

BRIEF DESCRIPTION OF THE DRAWINGS

FIG. 9 is a rear view showing a state where the disc holder is mounted on the apparatus shown in FIG. 1;

FIG. 10 is a perspective view showing an embodiment of a floppy disc which is employed in the apparatus according to the present invention;

FIG. 11 is a diagram for explaining the shape of a cam shown in FIG. 2;

FIG. 12 is a diagram for explaining the relationship between a guide roller and the cam shown in FIG. 11;

DETAILED DESCRIPTION

Figure 1:
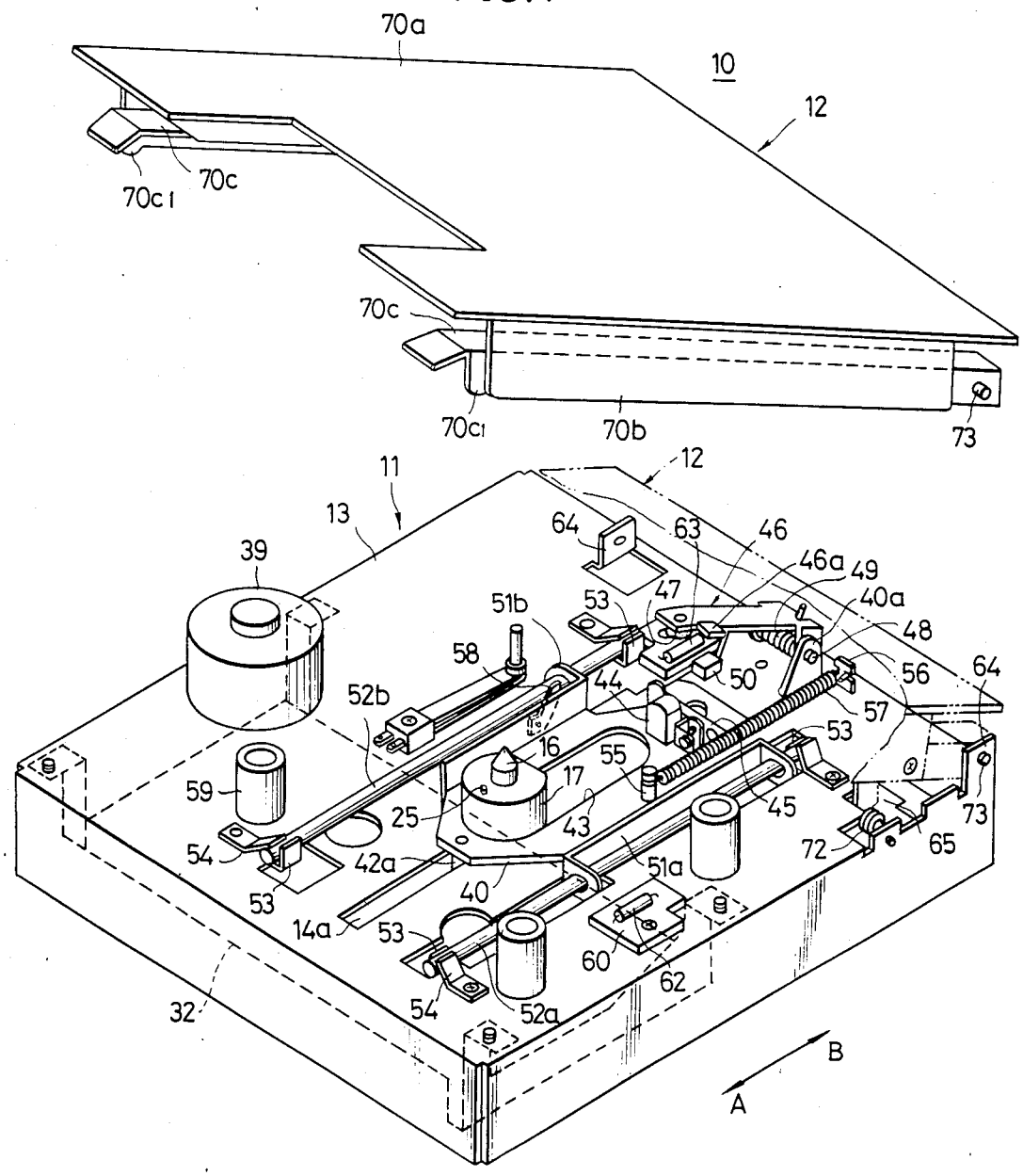
FIG. 1 is a perspective view, with a part disassembled, showing a first embodiment of a floppy disc recording and/or reproducing apparatus according to the present invention.

First, description will be given with respect to a first embodiment of a floppy disc recording and/or reproducing apparatus according to the present invention, by referring to FIGS. 1 through 12. In FIG. 1, a floppy disc recording and/or reproducing apparatus 10 generally comprises a main recording and/or reproducing apparatus body 11, and a disc holder 12 which is pivotally supported at one end thereof. The disc holder 12 is upwardly and downwardly rotatable.

Figure 2:
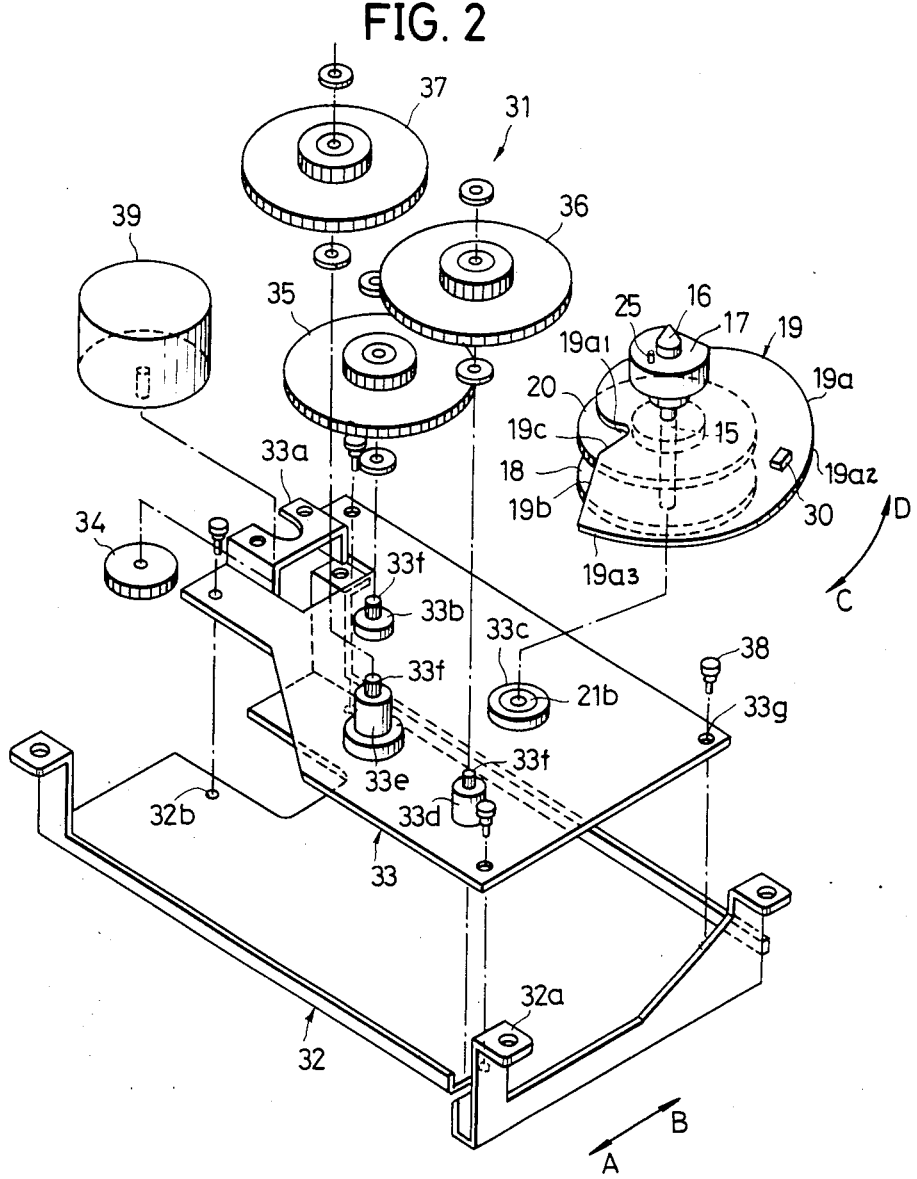
FIG. 2 is a disassembled perspective view showing a driving and gear mechanism in the apparatus shown in FIG. 1.
Figure 3:
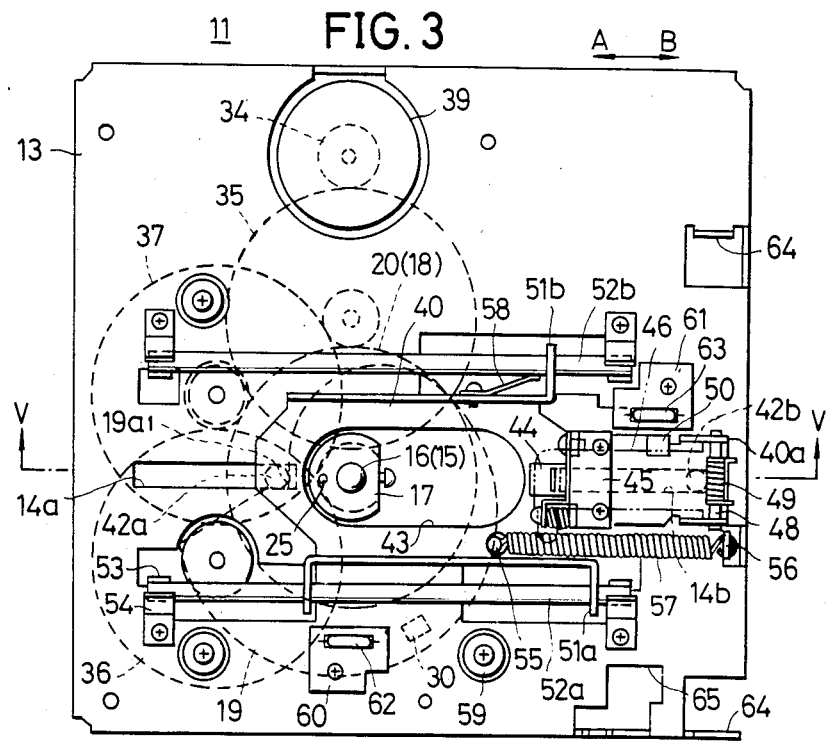
FIG. 3 is a plan view showing the apparatus shown in FIG. 1 with a disc holder removed.
Figure 4:
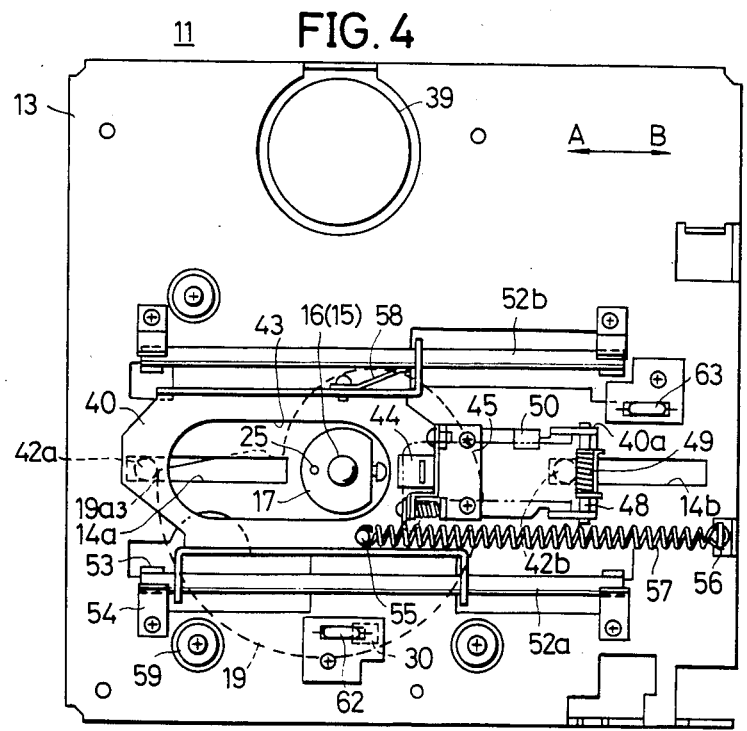
FIG. 4 is a plan view showing the apparatus shown in FIG. 3 in a state where a head has moved.

As shown in FIGS. 3 and 4, a frame 13 of the main apparatus body 11 is provided with a pair of guide grooves 14a and 14b. The guide grooves 14a and 14b lie on the same imaginary line, and extend in the directions of arrows A and B (that is, toward the front and rear of the apparatus 10). As shown in FIGS. 2 and 5 through 7, a fitting shaft 16 and a disc table 17 are fixedly fitted on top of a driving shaft 15, and a gear 18 is fixedly fitted on a lower end portion of the driving shaft 15 so as to rotate unitarily with the driving shaft 15. Mutually integral cam plate 19 and gear 20 are fitted on an intermediate portion of the driving shaft 15, so as to rotate independently of the driving shaft 15. The driving shaft 15 penetrates through the frame 13, and is rotatably supported by bearings 21a and 21b.

Figure 7:
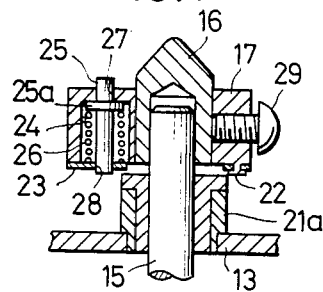
FIG. 7 is an enlarged view showing a rotary shaft part in the apparatus shown in FIG. 5.
Figure 8:
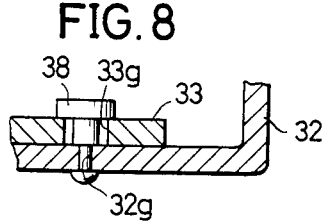
FIG. 8 is an enlarged view showing a mounting position of a support plate on a frame in the apparatus shown in FIG. 5.

The disc table 17 is made of die-cast zinc. As shown in FIG. 7, a spring support plate 23 is mounted on the lower surface of the disc table 17 by calking a projection 22 formed on the lower surface of the disc table 17. An engaging pin 25 for positioning a disc, is accommodated within a depression 24 of the disc table 17. The engaging pin 25 penetrates through the spring support plate 23, and is freely movable upwardly and downwardly. The engaging pin 25 is urged upwardly by a coil spring 26, and a flange part 25a of the engaging pin 25 makes contact with the ceiling of the depression 24.

In this state, the upper end of the engaging pin 25 projects upwardly from the top surface of the disc table 17. The engaging pin 25 is guided in the upward and downward directions by a hole 27 in the disc table 17 and a hole 28 in the spring support plate 23. The disc table 17 is secured on the fitting shaft 16 by a securing screw 29.

As shown in FIGS. 2 and 11, the cam plate 19 comprises a cam part 19a, a sloping cam part 19b, and a parallel cam part 19c. The cam part 19a has a spiral outer periphery, and is made up of a small diameter cam portion 19a1, a medium diameter cam portion 19a2, a large diameter cam portion 19a3. The parallel cam part 19c is parallel to the directions of the arrows A and B, at an initial position thereof indicated by a phantom line in FIG. 3 and indicated by a solid line in FIG. 11. A magnet 30 shown in FIGS. 3 and 4 is fixed at a predetermined position on the upper surface of the cam plate 19.

Figure 5:
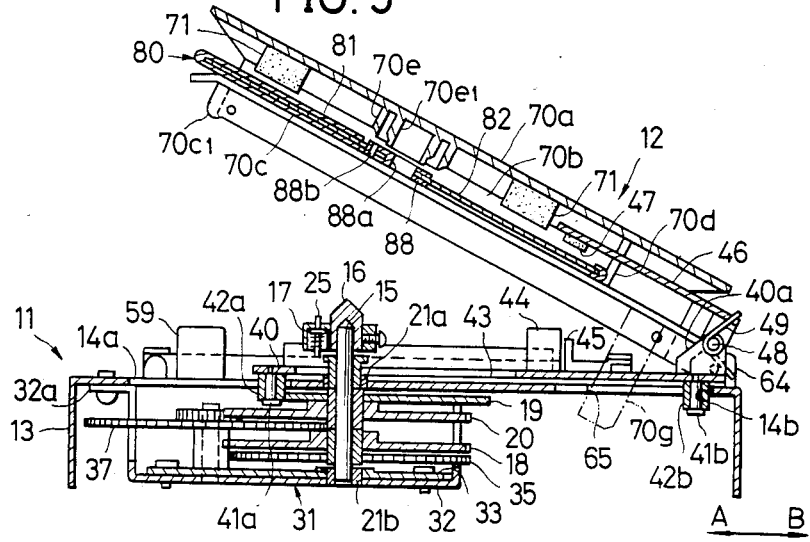
FIG. 5 is a view in vertical cross section along a line V—V in FIG. 3 with the disc holder assembled, in a state where the disc holder has rotated upwardly.
Figure 6:
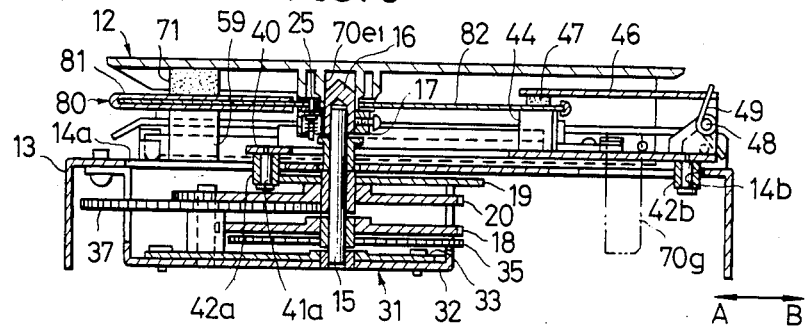
FIG. 6 shows a state where the disc holder has rotated downwardly in the apparatus shown in FIG. 5.

A gear mechanism 31 shown in FIGS. 2, 5, and 6 comprises a support plate frame 32 made of a metal, a gear shaft support plate 33 made of a resin, and gears 34 through 37 and the gears 18 and 20 which are respectively made of a resin. The support plate frame 32 comprises four mounting plate portions 32a which are formed by bending portions of the support plate frame 32, and four holes 32b for small diameter pins. The gear shaft support plate 33 comprises an inverted U-shaped portion 33a, four boss portions 33b through 33e of differing heights, and four holes 33g for large diameter pins. The boss portions 33b, 33d, and 33e each have a gear portion 33f, and the bearing 21b is fixed on the boss portion 33c.

The support plate 33 is mounted on top of the frame 32, by inserting four stepped pins 38 through the holes 33g and 32b and calking the tips ends of the pins 38 which project downwardly from the lower surface of the frame 32. The stepped pins 38 are inserted through the holes 33g with a little play, not only for providing adjusting space upon assembly, but also for the reasons explained hereinafter. In other words, the support plate 33 determines the separations among gear shafts when the gears 18, 20, and 34 through 37 mesh with each other. Because the support plate 33 and the gears 18, 20, and 34 through 37 are made of resins having the same coefficient of thermal expansion, the support plate 33 and the gears 18, 20, and 34 through 37 respectively undergo thermal expansions to approximately the same extent even when the ambient temperature changes, and thus, an undesirable effect such as backlash will not be introduced in the meshing of the gears 18, 20, and 34 through 37. However, the frame 32 must be made of a metal because the frame 32 must be hard and rigid to serve its purpose. Hence, the coefficient of thermal expansion of the frame 32 greatly differs from the coefficient of thermal expansion of the support plate 33. As a result, when the frame 32 and the support plate 33 are fixed together without play and the ambient temperature changes, for example, the support plate 33 will be deformed more than the amount deformed by thermal expansion, by the frame 32 which undergoes a larger deformation due to thermal expansion. In this case, undesirable effects are introduced in the meshing of the gears 18, 20, and 34 through 37. Accordingly, the difference between the deformations of the frame 32 and the support plate 33 due to the thermal expansion, is absorbed by the play between the pins 38 and the holes 33g, so that the meshing of the gears 18, 20, and 34 through 37 are constantly maintained stable without backlash.

The gear 34 is secured on an output shaft of a motor 39 which will be described later on in the specification, below the U-shaped portion 33a. The gears 35, 36, and 37 are respectively supported by the respective gear portions 33f of the boss portions 33b, 33d, and 33e. The lower end of the driving shaft 15 is inserted into the bearing 21b and supported by this bearing 21b. The gears 34, 35, 18, 36, 37, and 20 mesh in this sequence. Accordingly, the rotation of the motor 39 is successively reduced by the gears 34, 35, and 18, and is transmitted to the driving shaft 15 having the gear 18 fixed thereon. The driving shaft 15 thus rotates in the direction of an arrow C in FIG. 2 at a predetermined rotational speed. Next, the rotation of the gear 18 is successively reduced by the gears 36, 37, and 20, and is transmitted to the cam plate 19 integrally having the gear 20. The cam plate 19 rotates in the direction of an arrow D in FIG. 2 at a rotational speed which is less than the predetermined rotational speed described above.

The motor 39 is secured on top of the U-shaped portion 33a by screws, and the upper part of the motor 39 penetrates and projects through the frame 13. The vibration of the motor 39 is effectively absorbed by the resiliency of the resin which makes up the support plate 33 and the resiliency of the U-shaped portion 33a due to its inverted U-shape.

As shown in FIG. 5, the gear mechanism 31 is fixedly screwed onto the lower surface of the frame 13 by use of the mounting plate portions 32a, through the frame 32 and the support plate 33.

A metal carriage 40 comprises a pair of guide rollers 42a and 42b supported on respective pins 41a and 41b which project downwardly in the same imaginary line along the directions of the arrows A and B, as shown in FIGS. 1 and 3 through 6. The pair of guide rollers 42a and 42b are fitted within the respective guide grooves 14a and 14b. As will be described later on in the specification, the carriage 40 moves linearly in the directions of the arrows A and B between the position shown in FIG. 3 and the position shown in FIG. 4, as the guide rollers 42a and 42b are guided by the respective guide grooves 14a and 14b. A groove 43 through which the driving shaft 15, the bearing 21a, and the like are inserted, is provided on the carriage 40 so that the movement of the carriage 40 is not interfered by such members. A head holder 45 which holds a magnetic head 44, is mounted on the carriage 40. The center of the magnetic head 44 lies on an imaginary line which connects the centers of the driving shaft 15 and the guide rollers 42a and 42b in the directions of the arrows A and B in FIGS. 3 and 4. In FIGS. 3 and 4, the guide roller 42a is located on one side (left side in FIGS. 3 and 4) of the driving shaft 15, and the guide roller 42b and the magnetic head 44 are located on the other side (right side in FIGS. 3 and 4) of the driving shaft 15.

A pad support arm 46 has a pad 47 provided on the lower surface at the tip end thereof. The rear end of the pad support arm 46 is pivotally supported by a pin 48 which is supported between a pair of cut-and-bent portions 40a which are formed on the carriage 40. Thus, the pad support arm 46 is rotatable upwardly and downwardly. The pad support arm 46 is urged to rotate downwardly by a torsion spring 49 which is fitted over the pin 48. A magnet 50 is located on the carriage 40.

A pair of guided parts 51a and 51b which extend in the directions of the arrows A and B, are integrally formed on the right and left sides of the carriage 40. A pair of guide rods 52a and 52b are inserted through the respective guided parts 51a and 51b, so as to guide the guided parts 51a and 51b. The guide rods 52a and 52b are respectively held in place by four cut-and-bent parts 53 which are integrally formed on the frame 13 and four leaf springs 54 which are fixed on the frame 13. Holes in the guided parts 51a and 51b, through which the guide rods 52a and 52b are inserted, each have a shape so that the guided parts 51a and 51b are supported without play in the vertical direction and supported with slight play in the horizontal direction.

A coil spring 57 is stretched between an engaging pin 55 which is embeddedly provided on the upper surface of the carriage 40 and a cut-and-bent part 56 which is provided on the frame 13. The carriage 40 is urged to move in the direction of the arrow B by the contracting force exerted by the spring 57. Hence, the guide roller 42a is constantly in contact with the outer surface of the cam plate 19. In addition, the widths of the guide grooves 14a and 14b are set slightly larger than the respective widths of the guide rollers 42a and 42b. A leaf spring 58 is connected to the guided part 51b of the carriage 40 so that the guided part 51b pushes against the guide rod 52b, and the carriage 40 is constantly pushed against one side. For this reason, the guide rollers 42a and 42b push lightly against the right edges of the respective guide grooves 14a and 14b, and the carriage 40 is guided to positively undergo a linear movement.

Three floppy disc supports 59 are provided on the frame 13. Further, reed switches 62 and 63 are mounted on respective base plates 60 and 61 which are located at predetermined positions on the frame 13. The reed switch 63 opposes the magnet 50 when the carriage 40 assumes the position shown in FIG. 3, and the reed switch 62 opposes the magnet 30 when the cam plate 19 assumes the position shown in FIG. 4.

The disc holder 12 is made of a resin, and generally comprises a top part 70a, a pair of side plate parts 70b, a guide plate part 70c located on the inner side of each of the side plate parts 70b, and a stopper part 70d, as shown in FIGS. 1, 5, and 9. The guide plate parts 70c are fixed in parallel on both sides of the top part 70a, and a front end sloping portion 70c1 is formed on each of the guide plate parts 70c. A boss part 70e having a hole 70e1, is provided on the lower surface of the top part 70a. In addition, an engaging plate part 70f and three sponge pads 71 are also provided on the lower surface of the top part 70a. A stopper plate part 70g which projects downwardly, is provided in a vicinity of the rear part of the right guide plate part 70c (shown on the left in FIG. 9). The pair of guide plate parts 70c each have a pin 73 located on a rearwardly extending portion thereof. The disc holder 70 is thus pivotally supported by the pins 73 which are fitted into respective holes in a pair of cut-and-bent plate parts 64. The disc holder 70 is rotatable upwardly and downwardly, and the stopper plate part 70g is inserted within an opening 65 in the frame 13.

A toggle spring 72 has one end thereof engaged to a cut-and-bent part of the frame 13 and the other end thereof engaged to the stopper plate part 70g. The toggle spring 72 urges the disc holder 12 to rotate upwardly, and holds the disc holder 12 in an upwardly rotated position where the stopper plate part 70g makes contact with the edge of the opening 65.

The pad support arm 46 integrally comprises an engaging arm part 46a which is engageable with the engaging plate part 70f of the disc holder 12. Accordingly, when the disc holder 12 is rotated upwardly as shown in FIG. 5, the engaging plate part 70f engages with the engaging arm part 46a, and the pad support arm 46 is rotated upwardly together with the disc holder 12. A floppy disc 80 is made up of a rectangular case 81 made of a resin, and a main floppy magnetic disc body 82 which is accommodated within the case 81, as shown in FIG. 10. The main disc body 82 is rotatable within the case 81. A hole 83 and an elongated hole 84 which communicates to the hole 83, are formed on both the upper and lower surfaces of the case 81. Projections 85 are formed on both the right and left sides of the case 81 at the front thereof. Holes 86 are formed on both the right and left sides of the case 81 in a vicinity of the rear thereof. A tabs 87 is provided within each hole 86. The main disc body 82 comprises a hub 88 at the center thereof. A center hole 88a and an engaging hole 88b are formed in the hub 88. The hub 88 is exposed through the holes 83 in the case 81. A label 89 which contains printed information such as the name of the product, is adhered on the upper and lower surfaces of the case 81 in the vicinity of the front thereof.

Next, description will be given with respect to the operation of the apparatus 10. First, the floppy disc 80 is inserted into the disc holder 12 which assumes the upwardly rotated position shown in FIG. 5. The floppy disc 80 is inserted from the front of the disc holder 12 into a space which is defined by the top part 70a and the pair of guide plate parts 70c while making contact with the lower surface of the top part 70a, to a position where the rear of the case 81 makes contact with the stopper part 70d.

When the disc holder 12 is manually pushed downwardly against the force exerted by the toggle spring 72, the disc holder 12 rotates downwardly by itself due to the action of the toggle spring 72 as the disc holder 12 is rotated downwardly exceeding a predetermined rotational position. Thus, the sloping portions 70c1 of the guide plate parts 70c make contact with upper surface of the frame 13, and the apparatus 10 assumes the state shown in FIGS. 6 and 9. In this state, the disc holder 12 is continuously urged to rotate downwardly by the force exerted by the toggle spring 72.

Accordingly, the lower surface of the case 81 of the inserted floppy disc 80 makes contact with the three floppy disc supports 59 so as to position the floppy disc 80, and the upper surface of the case 81 is pushed by the three sponge pads 71, as shown in FIG. 6. The floppy disc 80 is pinched and supported at three positions between the sponge pads 71 and the floppy disc supports 59, and is stable held without being affected by external vibrations and the like. The pinching force exerted by the sponge pads 71 and the floppy disc supports 59, is originated from the toggle spring 72.

At the same time, the fitting shaft 16 of the driving shaft 15 relatively enters through the circular hole 83 in the lower surface of the case 81, penetrates through the center hole 88a in the hub 88 of the main disc body 82, and fits within the hole 70e1 in the boss part 70e of the disc holder 12. In addition, the disc table 17 makes contact with the lower surface of the hub 88 of the main disc body 82, through the circular hole 83.

In this state, the main disc body 82 is assumes an arbitrary rotational position, and the engaging hole 88b in the hub 88 does not necessarily oppose the engaging pin 25 of the disc table 17. Accordingly, when the engaging hole 88b in the hub 88 does not oppose the engaging pin 25 of the disc table 17, the engaging pin 25 is once pushed downwardly against the force exerted by the spring 26 to a level which substantially coincides with the upper surface of the disc table 17. Further, the upper end of the head 44 relatively enters through the elongated hole 84 in the lower surface of the case 81, to make contact with the lower surface of the main disc body 82.

The pad support arm 46 is rotated downwardly by the torsion spring 49, and the pad 47 pushes against the upper surface of the main disc body 82 through the elongated hole 84 in the upper surface of the case 81. As a result, the pad 47 pushes the main disc body 82 lightly against the head 44.

Next, the motor 39 is rotated for a short duration, and the driving shaft 15 (and the disc table 17) starts to rotate in the direction of the arrow C in FIG. 11 at a slow speed, based on a speed reduction rate a of the gears 34, 35, and 18 in the gear mechanism 31. Then, the engaging pin 25 also starts to rotate in a state where the top thereof is in contact with the lower surface of the hub 88. When the engaging pin 25 opposes the engaging hole 88b in the hub 88, the engaging pin 25 is pushed upwardly into the engaging hole 88b by the action of the coil spring 26. Thereafter, the disc table 17 and the main disc body 82 rotate unitarily. It is sufficient to rotate the driving shaft 15 to undergo one revolution at the maximum, in order to engage the engaging pin 25 with the engaging hole 88b. The cam plate 19 undergoes a slight rotation in the direction of an arrow D in FIG. 11 during this time, however, this slight rotation of the cam plate 19 is negligible.

Next, the motor 39 is rotated again, and the driving shaft 15 and the main disc body 82 start to rotate unitarily in the direction of the arrow C in FIG. 11, based on the speed reduction rate a. At the same time, the cam plate 19 starts to rotate in the direction of the arrow D in FIG. 11 at an extremely slow speed, based on a speed reduction rate b of all the gears 34 through 37, 18, and 20 in the gear mechanism 31, where $b < < a$. As the cam plate 19 rotates, the guide roller 42a relatively makes contact with the spiral cam part 19a of the cam plate 19, so as to gradually make contact with the small diameter cam portion 9a1, the medium diameter cam portion 19a2, and the large diameter cam portion 19a3. Hence, the carriage 40 moves in the direction of the arrow A at an extremely slow speed, against the force exerted by the coil spring 57.

As the carriage 40 moves in the direction of the arrow A, the head 44 moves linearly in the direction of the arrow A in the radial direction of the main disc body 82 while making contact with the main disc body 82 which rotates in the direction of the arrow C. As a result, the head 44 records and/or reproduces signals on the main disc body 82 by scanning over a spiral track 90 which is indicated by a one-dot chain line in FIG. 11. When the carriage 40 slides slightly in the direction of the arrow A from the position shown in FIG. 3, the head 44 reaches a position 44-1 shown in FIG. 11, and the magnet 50 opposes and closes the lead switch 63, an enable signal which indicates that a recording or a reproduction can be carried out is generated from the lead switch 63. Thus, the actual recording of reproduction of the signals with respect to the main disc body 82 is started from this point in time when the enable signal is generated.

As the cam plate 19 rotates, the head 44 continuously records or reproduces the signals on or from the spiral track 90, from the outer periphery of the disc to the inner periphery of the main disc body 82. When the main disc body 82 rotates over a predetermined number of revolutions, the cam plate 19 undergoes approximately one revolution, and the head 44 reaches a position 44-2 shown in FIG. 11, the magnet 30 on the cam plate 19 opposes and closes the lead switch 61. Hence, a prohibit signal is generated from the lead switch 61 to prohibit the recording or reproduction, and the recording or reproduction is accordingly terminated.

In this state, the guide roller 42a assumes a position 42a-1 shown in FIG. 11, and is in contact with the large diameter cam portion 19a3 of the cam plate 19. As the cam plate 19 continues to rotate, the guide roller 42a then makes contact with and is guided by the sloping cam part 19b, since the carriage 40 is urged to move in the direction of the arrow B by the coil spring 57. The guide roller 42 under guidance of the sloping cam part 19b then reaches the parallel cam part 19c. Therefore, the carriage 40 returns in the direction of the arrow B due to the action of the coil spring 57, at a speed which is faster than the movement of the carriage 40 in the direction of the arrow A.

When the guide roller 42a moves to the parallel cam part 19c, the carriage 40 slides back at a high speed in one movement to the position shown in FIG. 3, due to the action of the coil spring 57, until the guide roller 42a again makes contact with the small diameter cam portion 19a1.

Because the cam plate 19 is provided with the sloping cam part 19b, a large portion of the returning stroke of the carriage 40 is carried out with the speed which is slower than the high speed described above. As a result, the mechanical shock which is introduced as the carriage 40 undergoes the returning stroke is greatly reduced, and the reliability of the apparatus 10 is accordingly improved. Further, it is possible to reduce the wear of the head 44 which is in contact with the main disc body 82 even while the carriage 40 undergoes the returning stroke, because the returning stroke is carried out at the speed which is slower than the high speed.

Since the pair of guide rollers 42a and 42b of the carriage 40 are provided on opposite sides with respect to the driving shaft 15 with a large separation between the guide rollers 42a and 42b, and are guided within the respective guide grooves 14a and 14b, the carriage 40 can slide with a high precision. Moreover, with respect to the guide roller 42a, the contact point between the guide roller 42a and the cam plate 19, is located above an imaginary line which is in the directions of the arrows A and B and passes the center of the guide roller 42a in FIG. 11. Further, because the cam plate 19 rotates in the direction of the arrow D and pushes the guide roller 42a downwardly in FIG. 11, the guide roller 42a is constantly pushed against the right side (lower side in FIG. 11) of the guide groove 14a. In addition, since the head 44 is located between the driving shaft 15 and the guide roller 42b and receives a force from the rotating main disc body 82 which urges the head 44 downwardly in FIG. 11, the guide roller 42b is constantly pushed against the right side (lower side in FIG. 11) of the guide groove 14b. Accordingly, while the carriage 40 slides, the guide rollers 42a and 42b are constantly pushed against the same side (lower side in FIG. 11) of the respective guide grooves 14a and 14b.

Therefore, the carriage 40 slides stably and smoothly under the guidance of the guide grooves 14a and 14b.

When aligning the head 44 during the assembling operation, an adjusting cam plate instrument having the same shape as the cam plate 19 is mounted on the frame 13, and the position of the head 44 with respect to the carriage 40 is adjusted by causing the guide roller 42a to make contact with the adjusting cam plate instrument, because the carriage 40 unitarily comprises the guide rollers 42a and 42b and the head 44. Hence, compared to a case where the guide roller 42a and the head 44 are not provided unitarily on the carriage 40, it is extremely easy to align the head 44 during the assembling operation.

In the present embodiment, the diameter of the main disc body 82 is 2.8 inches, the memory capacity of the main disc body 82 is 64 kilobytes, the recording system employed is the MFM system, the rotational speed of the main disc body 82 is 423 rpm, the track pitch is 0.4 mm, and the recording or reproducing time is 8 seconds. In addition, the carriage 40 and the cam plate 19 are made of a metal, and the base of the main disc body 82 is made of a resin. However, the material of the metal which is used for the carriage 40 and the cam plate 19, and the resin used for the base of the main disc body 82, are selected such that the coefficients of thermal expansion of the metal and the resin are approximately the same. In a specific example, the carriage 40 and the cam plate 19 are made of stainless steel, and the base of the main disc body 82 is made of polyethylene terephthalate, and both the stainless steel and the polyethylene terephthalate have a coefficient of thermal expansion of approximately $1.7 \pm 10^{-5}$ cm/cm/° C.

In order to ensure compatibility of the floppy disc 80, the track pitch P of the spiral track 90 in the radial direction must be constant from the outer periphery to the inner periphery of the main disc body 82. Description will hereinafter be given with respect to this condition which must be satisfied to ensure the above compatibility. It will be assumed that an imaginary line x connects a center E of the guide roller 42a and a center F of the cam plate 19 as shown in FIG. 12, and has a length $A(\theta)$, where $\theta$ is the total angle over which the cam plate 19 has rotated from the initial state. It will also be assumed that an imaginary line Y connects the center E of the guide roller 42a and a contact point G between the guide roller 42a and the cam plate 19, and has a constant length which is equal to a radius r of the guide roller 42a. The above condition can be satisfied if an angle $\beta$ formed between the imaginary lines x and y, remains constant while the cam plate 19 rotates.

It will be assumed that an imaginary line z connects center F of the cam plate 19 and the contact point G, and has a length $R(\theta)$. It will also be assumed that an angle $\alpha(\theta)$ is formed between the imaginary lines z and x. The angle $\alpha(\theta)$ is a function of the total rotating angle $\theta$ of the cam plate 19 from the initial state. The angle $\alpha(\theta)$ decreases as the angle $\theta$ increases, since the diameter of the cam plate 19 increases as the angle $\theta$ increases.

Accordingly, the following equation (1) stands in FIG. 12.

$$R(\theta)\cdot\cos\alpha(\theta) + r\cdot\cos\alpha = A(\theta) \qquad (1)$$

The following equation (2) can be obtained by rearranging the equation (1).

$$R(\theta) = [A(\theta) - r\cdot\cos\beta]/\cos\alpha(\theta) \qquad (2)$$

where $$A(\theta) = A_0 + \theta P/\Delta\theta \quad (3)$$

In the equation (3), $A_0$ is the initial value of the length $A(\theta)$ when the guide roller 42a is in contact with the small diameter cam portion 19a1, P is the track pitch, and $\Delta\theta$ is the angle over which the cam plate 19 rotates for one revolution of the main disc body 82. In the numerical example given before, the track pitch P is equal to 0.4 mm, and the angle $\Delta\theta$ is equal to 6°.

The following equation (4) also stands FIG. 12.

$$\tan \alpha(74) = r \cdot \sin\beta / [A(\theta) - r \cdot \cos\beta] \quad (4)$$

Accordingly, the following equation (5) can be derived from the equation (4).

$$\alpha = \tan^{-1} r \cdot \sin\beta / [A(\theta) - r \cdot \cos\beta] \quad (5)$$

In the equations (4) and (5), the angle $\beta$ is constant and is equal to 20°, for example. Accordingly, it is possible to successively obtain the length $R(\theta)$ with respect to a predetermined total rotating angle $\theta$ of the cam plate 19, by substituting the equations (3) and (5) into the equation (2). Thus, the cam plate 19 can be designed to satisfy the values of the length $R(\theta)$ which are obtained with respect to various values for the total rotating angle $\theta$ of the cam plate 19.

Next, when extracting the floppy disc 80 from the apparatus 10, the disc holder 12 is manually rotated upwardly so as to return the disc holder 12 to the position shown in FIG. 5. In this state, the stopper plate part 70g makes contact with the edge of the opening 65, and the disc holder 12 is maintained in this position by the action of the toggle spring 72. As the disc holder 12 is rotated upwardly, the fitting shaft 16 relatively escapes from the center hole 88a in the main disc body 82, and the engaging pin 25 slips out of the engaging hole 88b. Further, the upper end of the head 44 escapes from the elongated hole 84 in the lower surface of the case 81. The engaging arm 46a of the pad support arm 46 is engaged by the engaging plate part 70f, and is rotationally returned as shown in FIG. 5. Accordingly, the floppy disc 80 moves downwardly due to its own weight within the disc holder 12, and again makes contact with the guide plate part 70c. The operator holds and extracts the floppy disc 80 in this state. According to the apparatus 10, the sliding movement of the head 44 and the rotation of the main disc body 82 are both carried out by the single motor 39. Thus, the construction of the apparatus 10 is simple due to the use of only one motor, and the manufacturing cost of the apparatus 10 can be reduced compared to the conventional apparatus employing two motors for independently driving the head and the main disc body.

Next, description will be given with respect to a second embodiment of a floppy disc recording and/or reproducing apparatus according to the present invention, by referring to FIGS. 13 through 26. In FIGS. 13 through 26, those parts which are the same as those corresponding parts in FIGS. 1 through 12 are designated by the same reference numerals, and their description will be omitted.

A floppy disc recording and/or reproducing apparatus 100 generally comprises a main recording and/or reproducing apparatus body 101, and a disc holder 102 which is pivotally supported at one end thereof. The disc holder 102 is upwardly and downwardly rotatable.

Figure 15:
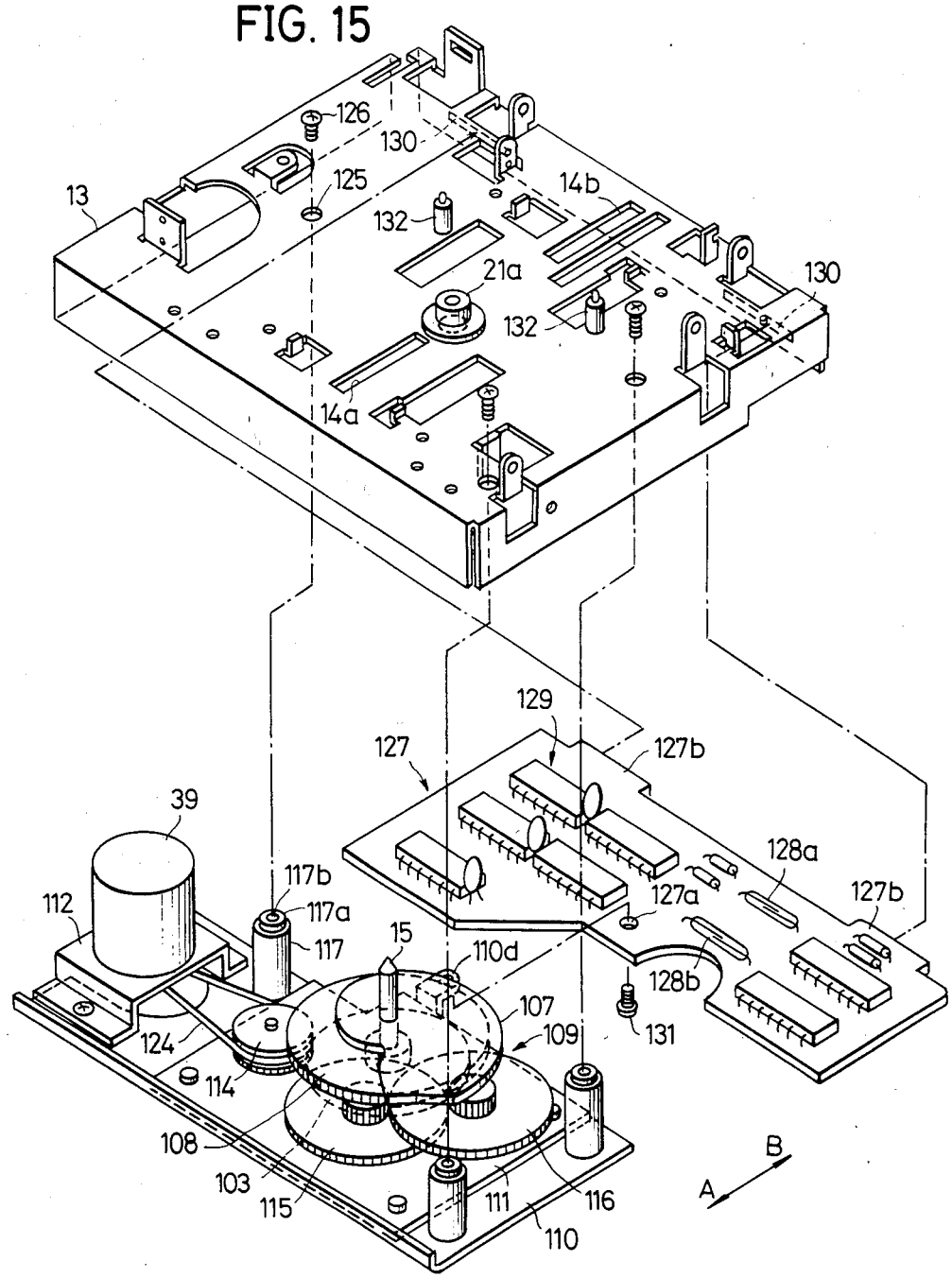
FIG. 15 is a disassembled perspective view showing another essential part of the apparatus shown in FIG. 13.
Figure 16:
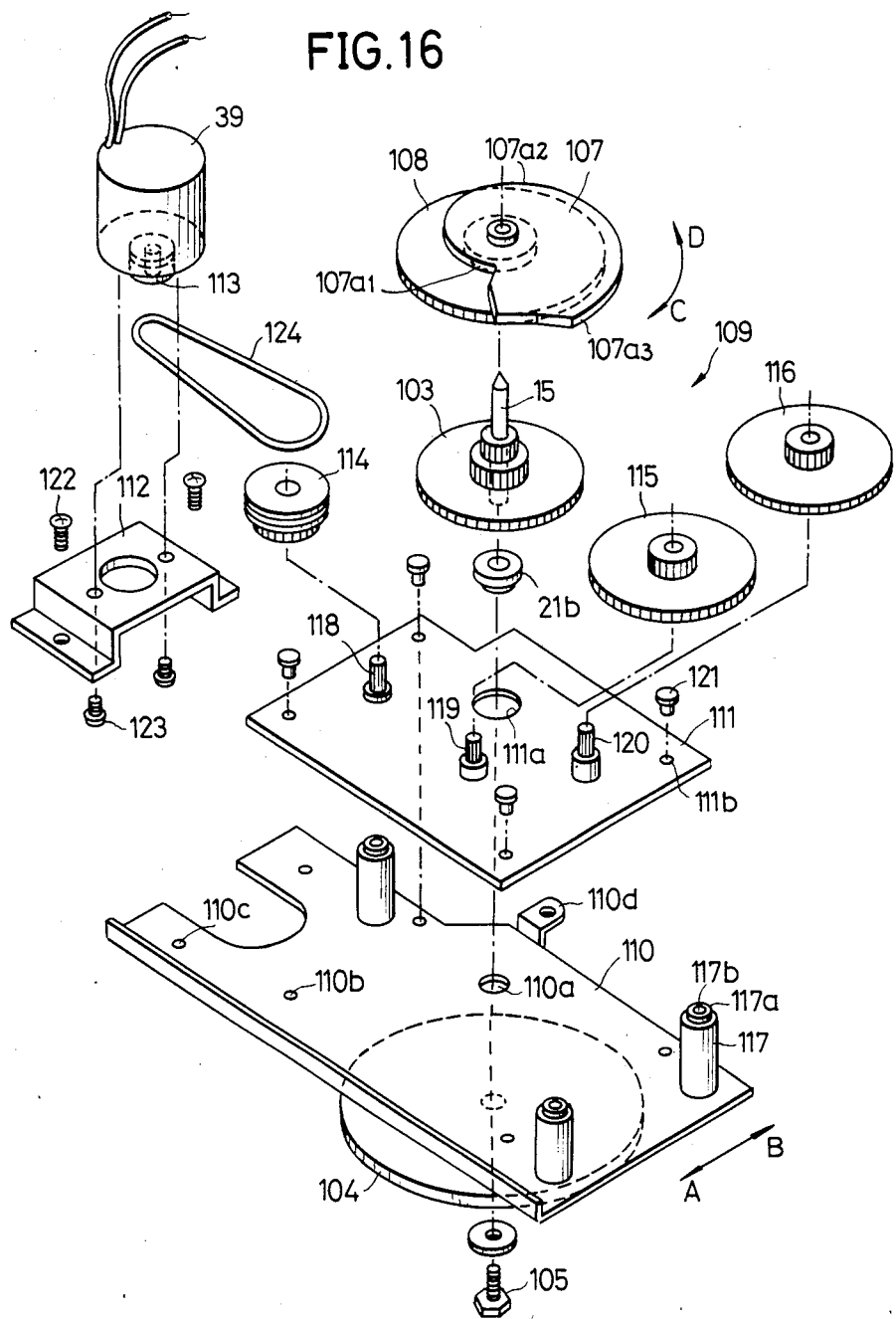
FIG. 16 is a disassembled perspective view showing a driving and gear mechanism in the apparatus shown in FIG. 13.
Figure 17:
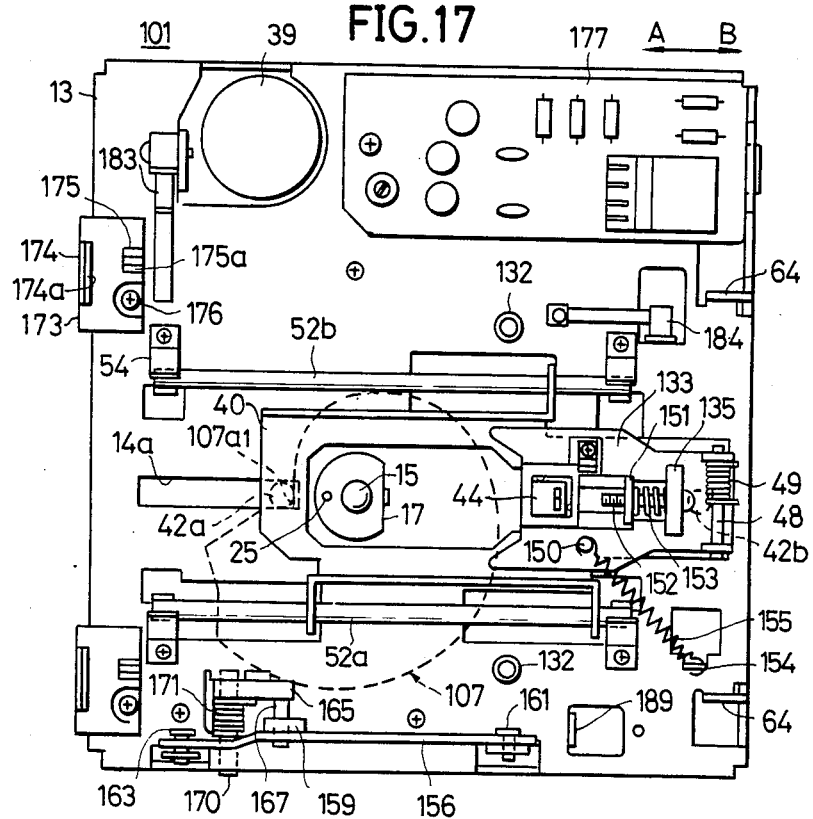
FIG. 17 is a plan view showing the apparatus shown in FIG. 13 with a disc holder removed.
Figure 18:
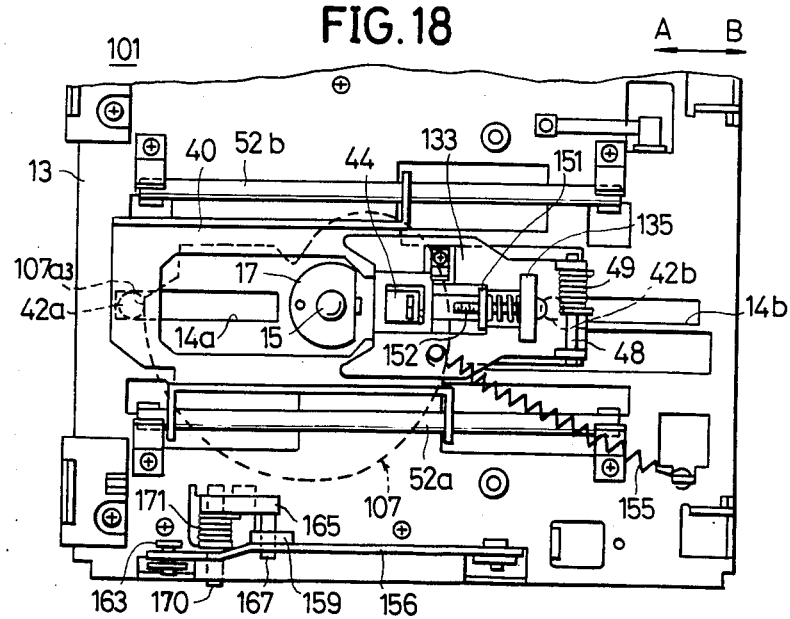
FIG. 18 is a plan view showing the apparatus shown in FIG. 17 in a state where a head has moved.
Figure 19:
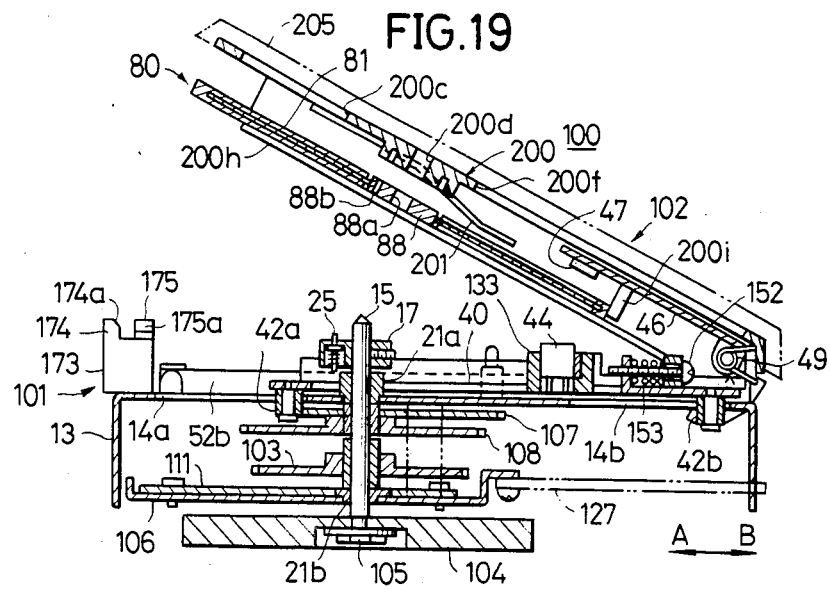
FIG. 19 is a view in vertical cross section of the apparatus shown in FIG. 17 with the disc holder assembled, in a state where the disc holder has rotated upwardly.

As shown in FIGS. 15, 16, and 19, the disc table 17 is fixedly fitted in a vicinity of the top of a driving shaft 15, and a gear 103 is fixedly fitted on a lower end portion of the driving shaft 15. Further, a flywheel 104 is fixed to the lower end portion of the driving shaft 15 by a screw 105. The flywheel 104 is disposed below a metal support frame 106. Mutually integral cam plate 107 and gear 108 are fitted on an intermediate portion of the driving shaft 15, so as to rotate independently of the driving shaft 15.

Figure 26:
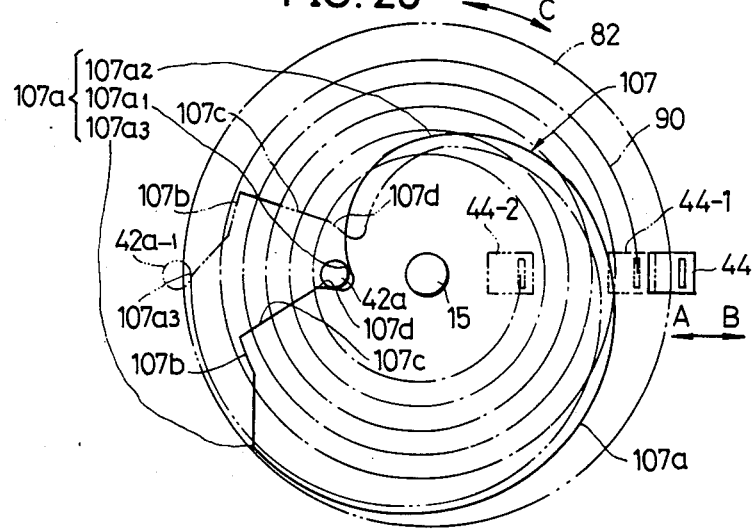
FIG. 26 is a diagram for explaining the shape of a cam shown in FIGS. 15 and 16.

As shown in FIGS. 16 and 26, the cam plate 107 comprises a cam part 107a, a stepped cam part 107b, a sloping cam part 107c, and a parallel cam part 107d. The cam part 107a has a spiral outer periphery, and is made up of a small diameter cam portion 107a1, a medium diameter cam portion 107a2, and a large diameter cam portion 107a3. The parallel cam part 107d is parallel to the directions of the arrows A and B, at an initial position thereof indicated by a phantom line in FIG. 17 and indicated by a solid line in FIG. 26.

A gear mechanism 109 shown in FIGS. 15 and 16 comprises a support plate frame 110 made of a metal, a gear shaft support plate 111 made of a resin, an inverted U-shaped part 112, a pulley 113, a pulley gear 114, and gears 115 and 16 and the gears 103 and 108. The pulley 113, the pulley gear 114, and the gears 115, 116, 103, and 108 are respectively made of brass. The support plate frame 110 comprises a center hole 110a, four holes 110b for small diameter pins, a pair of screw holes 110c, and a mounting plate part 110d. Three support pins 117 made of brass, each having a small diameter portion 117a and a screw hole 117b at the upper end thereof, are provided on the support plate frame 110. The gear shaft support plate 111 comprises a center hole 111a, four holes 111b for large diameter pins, and three gear shafts 118 through 120. The gear shaft support plate 111 is mounted on the upper surface of the support plate frame 110, by inserting four stepped pins 121 through the holes 111b and holes 110b and calking the tips ends of the stepped pins 121 which project below the support plate frame 110. The bearing 21b is fixedly fitted into the center hole 111a of the gear shaft support plate 111 and the center holes 110a of the support plate frame 110.

The U-shaped part 112 is secured on the frame 110 by a pair of screws 122 which are screwed into the screw holes 110c. The motor 39 is fixed on top of the U-shaped part 112 by a pair of screws 123.

The pulley 113 is fixed to the output shaft of the motor 39, below the U-shaped part 112. The pulley gear 114, and the gears 115 and 116 are supported by the respective gear shafts 118, 119, and 120. A belt 124 is arranged between the pulley 113 and a pulley part of the pulley gear 114. Accordingly, the rotation of the motor 39 is successively reduced by the pulley 113, the pulley gear 114, and the gear 103, and is transmitted to the driving shaft 15. As a result, the driving shaft 15 rotates in the direction of the arrow C in FIG. 16 at a predetermined rotational speed. On the other hand, the rotation of the gear 103 is successively reduced by the gears 115, 116, and 108, and is transmitted to the cam plate 107.

The gear mechanism 109 is positioned by fitting the small diameter parts 117a at the upper ends of the respective support pins 117, into corresponding positioning holes 125 in the frame 13, from under the frame 13.

The gear mechanism 109 is secured onto the frame 13 by screwing screws 126 into the respective screw holes 117b of the support pins 117.

According to this second embodiment, the gear mechanism 109 is mounted on the frame 13 through the plurality of support pins 117 which are independently provided on the support frame 110. Hence, compared to the case where the plurality of support plate parts are integrally bent and formed from the support frame 110 and are mounted on the frame as in the first embodiment described previously, it is possible to improve the precision with which the height of the support pins 117 are set and the precision with which the support pins 117 are set vertical with respect to the support frame 110. As a result, it is possible to improve the precision with which the gear mechanism 109 operates.

A first printed circuit 127 comprises a hole 127a, a pair of projecting plate parts 127b, and circuit parts 129 such as a pair of reed switches 128a and 128b. This first printed circuit 127 is accommodated below the frame 13. The first printed circuit 127 is mounted on the frame 13 by engaging the pair of projecting plate parts 127b with a pair of engaging grooves 130 of the frame 13, and screwing a screw 131 into a screw hole in the mounting plate part 110d of the gear mechanism 109 through the hole 127a. Accordingly, the first printed circuit 127 can be mounted on the frame 13 by the single screw 131, and the mountin9 process can be simplified. A pair of support pins 132 are provided on the frame 13.

A head holder 133 is provided on the carriage 40. The head holder 133 is made of die-cast aluminum, for example, and comprises a head holding part 134, a bridge part 135, a pair of support plate parts 136, a lower rib 137, a hole 138, a rectangular hole 139, and a hole 140.

Figure 24:
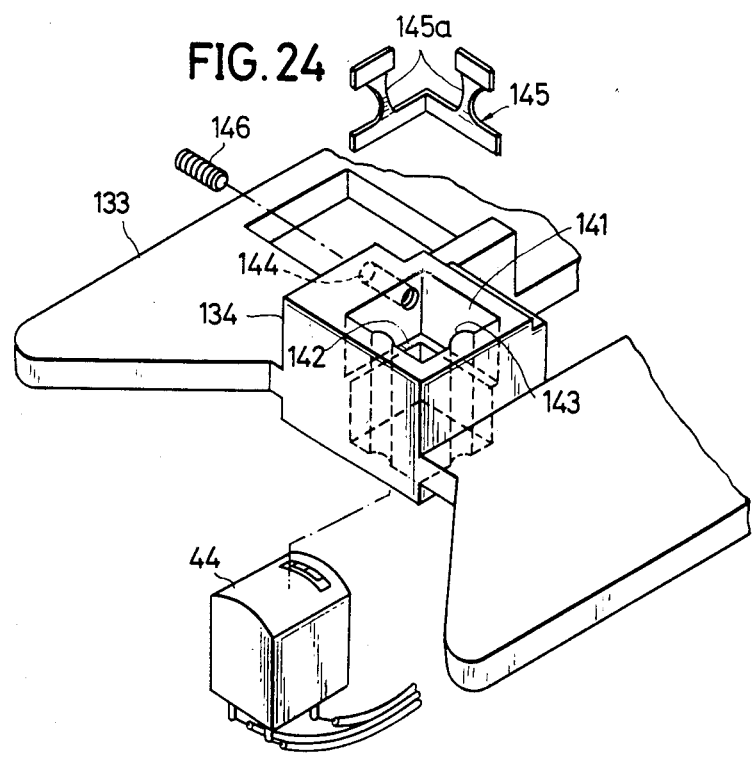
FIGS. 24 and 25 are a disassembled perspective view and a plan view respectively showing a head holder.
Figure 25:
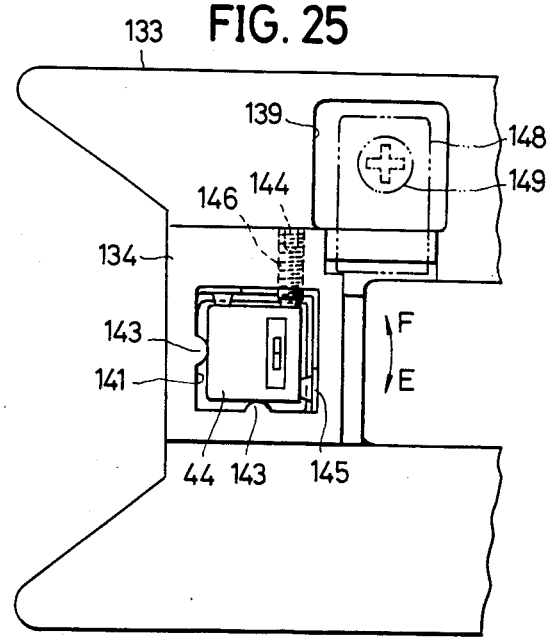

As shown in FIGS. 24 and 25, the head holding part 134 comprises an accommodating hole 141, a stepped part 142 formed along two adjacent sides of the accommodating hole 141, projecting parts 143 formed on the remaining two sides of the accommodating hole 141, and a screw hole 144 extending in a direction substantially perpendicular to one side surface of the accommodating hole 141. A leaf spring 145 comprises an L-shaped member, and two substantially T-shaped members which are disposed on top of the two sides of the L-shaped member. The leaf spring 145 is accommodated within the accommodating hole 141, and is placed onto the stepped part 142. The T-shaped members of the leaf spring 145 each have a curved stem portion 145a which curves inwardly The head 44 is accommodated within the accommodating hole 141 from the bottom of the accommodating hole 141. A screw 146 is screwed into the screw hole 144, and the tip end of the screw 146 which projects within the accommodating hole 141, makes contact with the left side of the head 44 nearer to the rear thereof. Accordingly, the head 44 is supported in a state where the two sides thereof are supported by the projecting parts 143 and the other two sides thereof are supported by the curved stem portions 145a of the leaf spring 145. Thus, when the carriage 40 is mounted on the frame 13 and the screw 146 is thereafter rotated and adjusted to increase the force with which the tip end of the screw 146 makes contact with one side of the head 44, the head 44 rotates slightly in the direction of an arrow E in FIG. 25 against the spring force exerted by the curved stem portions 145a. On the other hand, when the screw 146 is rotated and adjusted to decrease the force with which the tip end of the screw 146 makes contact with one side of the head 44, the head 44 rotates slightly in the direction of an arrow F in FIG. 25 due to the action of the curved stem portions 145a. Therefore, it is possible to adjust the azimuth of the head 44 with ease, by rotating and adjusting the screw 146.

The range in which the head 44 can be displaced is set to a small range, because the head 44 itself is accommodated within the accommodating hole 141. Accordingly, the head 44 is only displaced by a relatively small quantity when the screw 146 is rotated and adjusted, and it is possible to adjust the azimuth of the head 44 with a high precision. Moreover, the head 44 is prevented from being hit and damaged by other members, since the head 44 is accommodated within the accommodating hole 141. The head holder 133 as a whole can be made compact and the number of parts which are required is kept to a minimum, since it is only necessary to add the leaf spring 145 and the screw 146 as adjusting members.

The pad support arm 46 is made of a resin, and is pivotally supported on the support plate part 136 of the head holder 133 by the pin 48. The pad support arm 46 is rotatable upwardly and downwardly about the pin 48, and is urged to rotate downwardly by the torsion spring 49.

The head holder 133 which is mounted with the pad support arm 46, is placed on the upper surface of the carriage 40. The lower rib 137 fits into a hole 147 in the carriage 40, and the head holder 133 is positioned with respect to the carriage 40. In this state, the head holder 133 is relatively movable in the directions of the arrows A and B with respect to the carriage 40. Moreover, a leaf spring 148 is mounted on the carriage 40 by a screw 149, through the rectangular hole 139. In this state, a spring engaging projection 150 on the carriage 40 projects upwardly through the hole 140. In addition, a cut-and-bent part 151 also projects upwardly through the hole 138, to oppose the bridge part 135. A long screw 152 which passes through a hole in the bridge part 135, is screwed into a screw hole in the cut-and-bent part 151 with a coil spring 153 fitted over the screw 152 and disposed between the bridge part 135 and the cut-and-bent part 151. Accordingly, when the screw 152 is rotated and adjusted, the head holder 133 relatively and slightly slides in the direction of the arrow A or B with respect to the carriage 40. Hence, it is possible to finely adjust the track position of the head 44 with respect to the main disc body 82 of the floppy disc 80, as will be described later on in the specification.

The carriage 40 is urged in the direction of the arrow A by a coil spring 155 which is stretched across the spring engaging pin 150 and a spring engaging part 154 provided on the frame 13. This coil spring 155 is disposed obliquely to the directions of the arrows A and B. In this state, the guide roller 42a constantly makes contact with the peripheral surface of the cam plate 107. In addition, because the carriage 40 is simultaneously urged to the right side due to a component of force exerted by the obliquely disposed coil spring 155, the guide rollers 42a and 42b are constantly pushed against the right side of the respective guide grooves 14a and 14b. As a result, the carriage 40 can slide accurately under the guidance of the guide rollers 42a and 42b.

An eject lever 156 comprises a push button 157 at the front end thereof, an elongated hole 158, a lower bent cam part 159, a hole located at the rear end thereof, and a projection 160 below the elongated hole 158. The rear end of the eject lever 156 is pivotally supported by a pin 161 which penetrates through the hole in the rear end of the eject lever 156 and fits into a hole in a cut-and-bent part 162 of the frame 13. A pin 163 passes through the elongated hole 158 with some play, and is fixed to the cut-and-bent part 164. Thus, the pin 163 is movable between a range defined by the upper and lower ends of the elongated hole 158, and the eject lever 156 is accordingly rotatable upwardly and downwardly within the movable range of the pin 163.

An engaging lever 165 comprises an engaging part 166, a cam pin 167, and a boss part 168. The engaging lever 165 is pivotally supported by a pin 170 which is disposed between a right side plate 13a of the frame 13 and a downwardly cut-and-bent part 169. The pin 170 fits into the boss part 168 over which a torsion spring 171 is fitted, in a state where one end of the torsion spring 171 engages with the engaging lever 165 and the other end of the torsion spring 171 engages with the peripheral edge of an opening 172 in the frame 13. Accordingly, the engaging lever 165 is urged to rotate counterclockwise in FIG. 21, and the cam pin 167 pushes against the cam part 159 of the eject lever 156 so as to push the eject lever 156 upwardly. In this state, the eject lever 156 assumes an upper limit position where the lower end of the elongated hole 158 makes contact with the pin 163.

A pair of blocks 173 which are made of a resin for positioning the disc, each have disc positioning parts 174 and 175. The positioning part 174 comprises a sloping portion 174a, and the positioning part 175 comprises a sloping portion 175a. The blocks 173 are secured on the upper surface of the frame 13 by screws 176.

A second printed circuit 177 comprises a hole 178 and a projecting plate part 179. The second printed circuit 177 is secured on a projecting plate part 182 of the frame 13 by a screw 181 which is screwed into a hole of the projecting plate part 182 through the hole 178, in a state where the projecting plate part 179 is engaged with a slot 180a in a cut-and-bent part 180 of the frame 13.

Switches 183 and 184 are located on the frame 13. The switch 183 detects that a floppy disc is loaded in the recording and/or reproducing position in the apparatus 100, and the switch 184 detects the existence of the tab 87 on the floppy disc so as to prevent erroneous erasure of recorded signals.

A position detecting magnet 185 is mounted on the lower surface of the carriage 40 by a screw 186. As the carriage 40 moves in the direction of the arrows A and B, the magnet 185 moves within a groove 187 in the frame 13.

Figure 13:
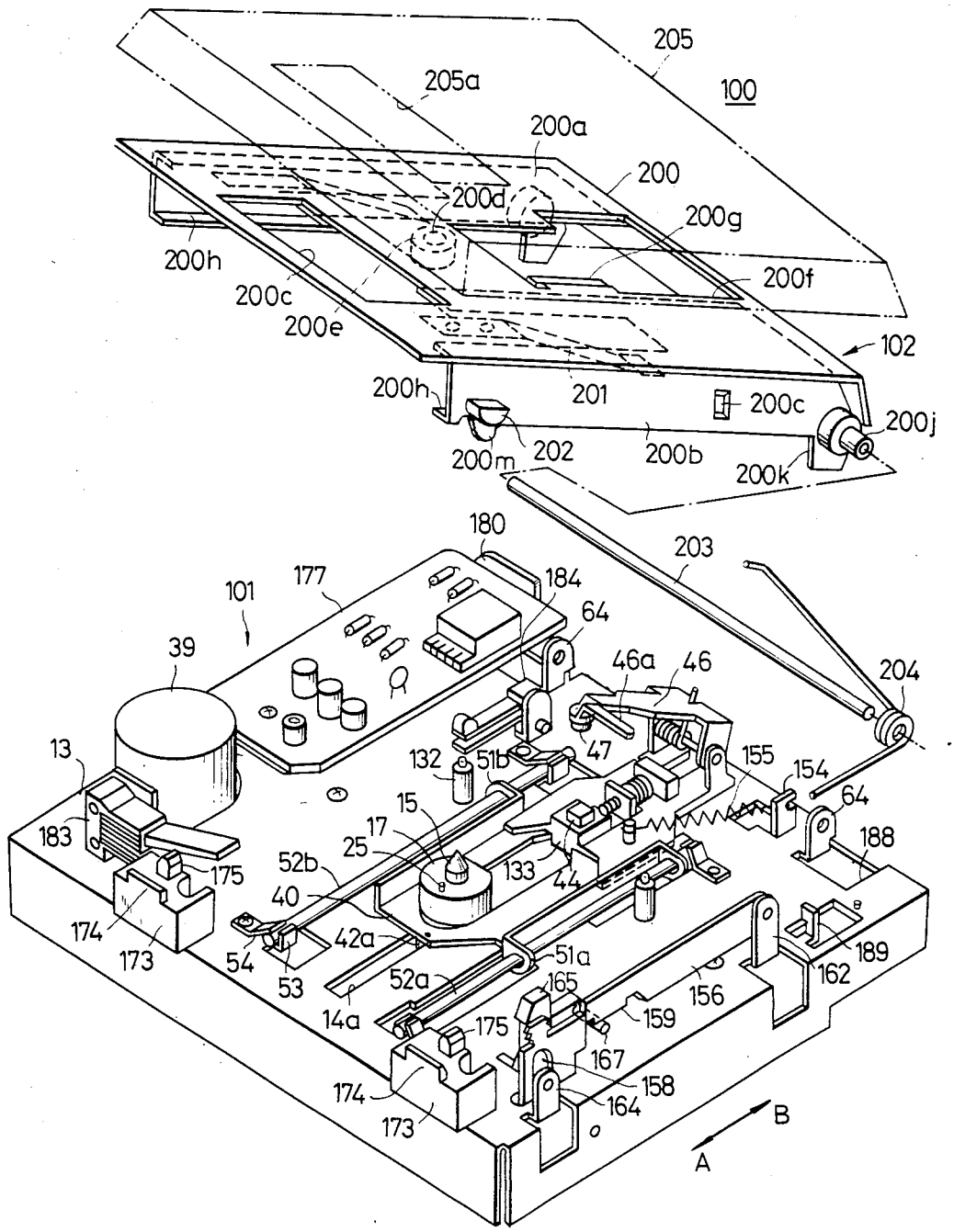
FIG. 13 is a perspective view, with a part disassembled, showing a second embodiment of a floppy disc recording and/or reproducing apparatus according to the present invention.
Figure 14:
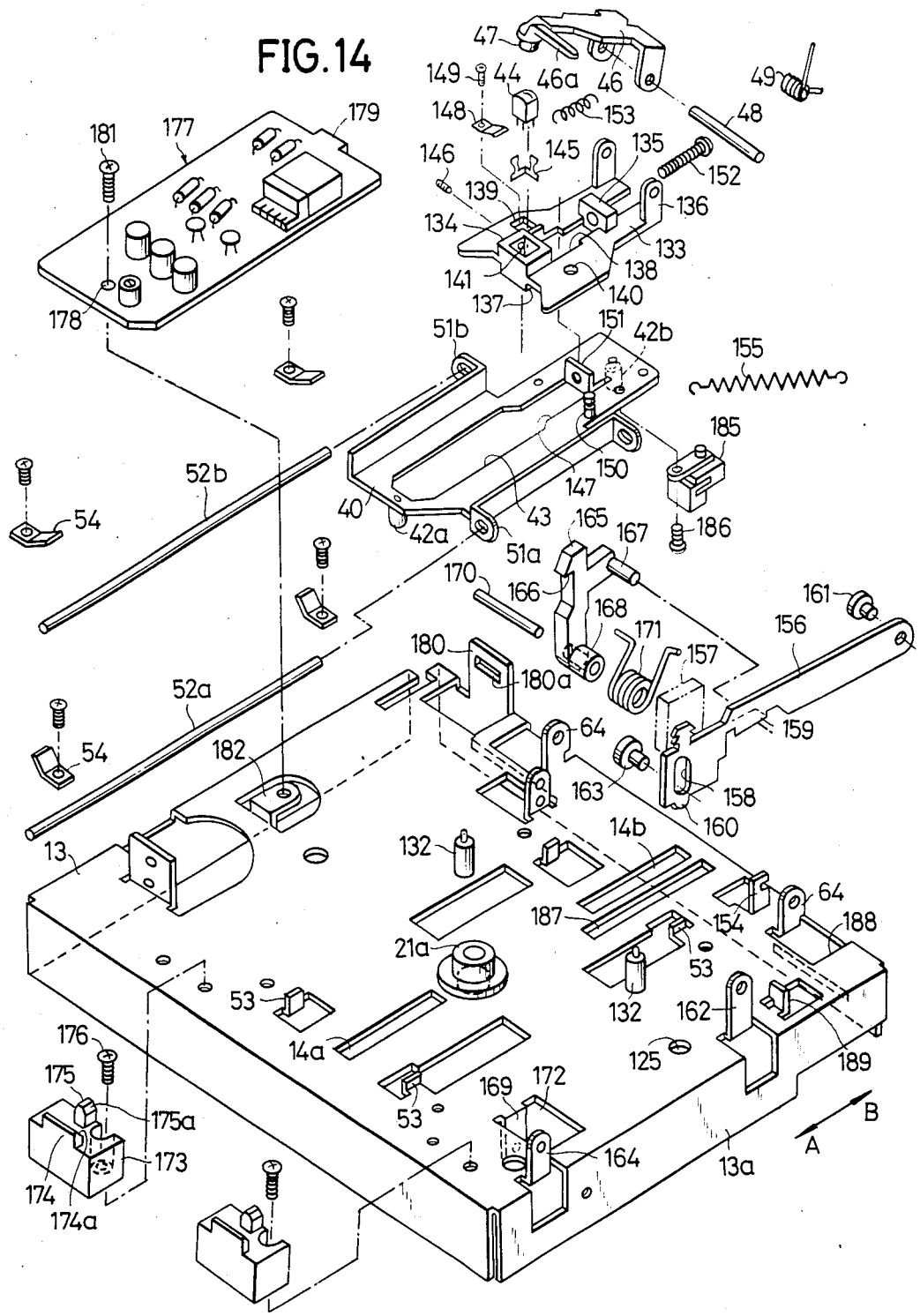
FIG. 14 is a disassembled perspective view showing an essential part of the apparatus shown in FIG. 13.

The disc holder 102 is made of a resin, and comprises a main disc holder body 200 which is generally made up of a ceiling part 200a, a pair of leaf springs 210 located on the lower surface of the ceiling part 200a, and side plate parts 200b. The ceiling part 200a comprises a rectangular hole 200c located near the front end thereof, a central boss part 200e which has a hole 200d and is located on the lower surface of the ceiling part 200a, a substantially rectangular hole 200f located near the rear end thereof, and inner engaging guides 200g which form a part of the hole 200f. The side plate parts 200b each comprise a lower disc holding part 200h, a disc stopper part 200i, a boss part 200j, and a stopper plate part 200k. The right side plate part 200b has an engaging part 202 and a projection 200m at the front end thereof. In FIG. 13, the main disc holder body 200 is pivotally supported onto the frame by a pin 203 which penetrates through the holes in the pair of boss parts 200j and holes in the pair of cut-and-bent parts 64. Thus, the main disc holder body 200 is rotatable upwardly and downwardly. Moreover, the stopper plate parts 200k are inserted into respective openings 188 in the frame 13. In this state, a torsion spring 204 which is fitted over one of the boss parts 200j, so that one end of the torsion spring 204 engages with the ceiling part 200a of the main disc holder body 200 and the other end of the torsion spring 204 engages with a spring engaging projection 189 on the frame 13. Accordingly, the main disc holder body 200 is urged to rotate upwardly by the torsion spring 204, and the stopper plate parts 200k make contact with the edges of the respective openings 188 so as to stop the main disc holder body 200 at the upper limit position.

Figure 21:
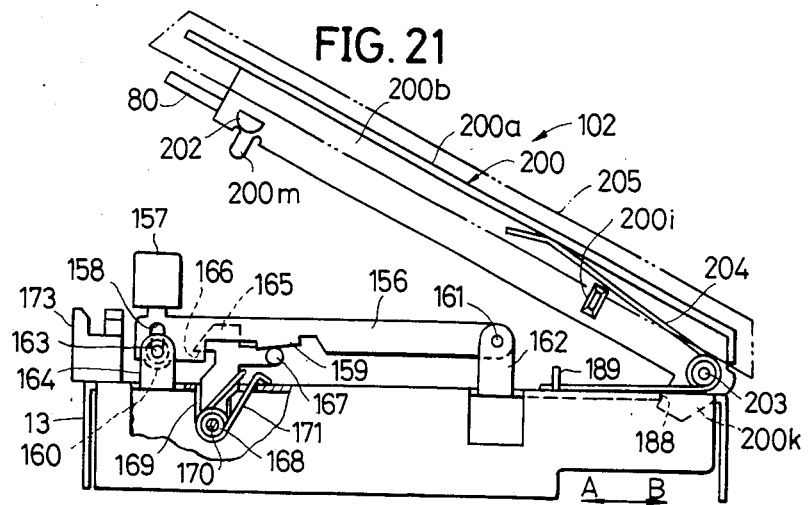
FIGS. 21, 22, and 23 are side views for explaining an eject mechanism in various states.

Next, description will be given with respect to the operation of the apparatus 100. When the floppy disc 80 is inserted into the main disc holder body 200 from the front thereof as shown in FIGS. 19 and 21, the rear end of the case 81 makes contact with the stopper part 200i, and the case 81 is held by the pair of disc holding parts 200h. Even when an attempt is made to insert the floppy disc 80 from the rear thereof, that is, from the wrong end, the erroneous insertion of the floppy disc 80 is prevented by the side plate parts 200b which hit the projections 85 of the case 81.

Figure 22:
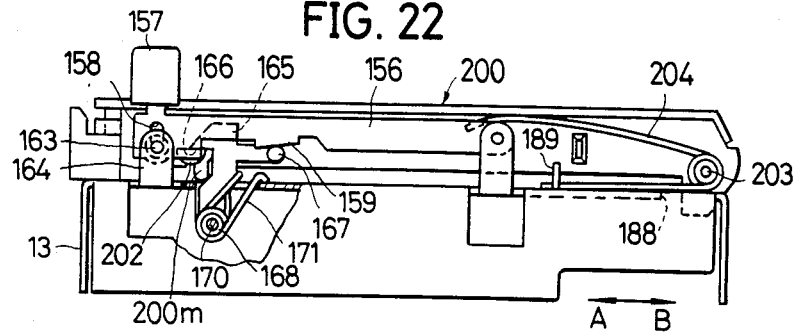

When the main disc holder body 200 is manually pushed downwardly against the force exerted by the torsion spring 204 from the state shown in FIG. 21, the engaging part 202 on the right side plate 200b of the main disc holder body 200 makes contact with the top of the engaging part 166 on the engaging lever 165. The engaging lever 165 is first pushed downwardly, but returns upwardly by the action of the torsion spring 171. As a result, the engaging part 202 engages with the lower part of the engaging part 166 as shown in FIG. 22, and the main disc holder body 200 is locked in the downwardly rotated or closed position. In this state, the projection 200m substantially makes contact with the upper surface of the frame 13.

Accordingly, the floppy disc 80 is moved downwardly together with the main disc holder body 200 which is rotated downwardly. The front lower edge of the case 81 makes contact with the pair of blocks 173, and the rear lower edge of the case 81 makes contact with the disc support pins 132. Hence, the floppy disc 80 is relatively moved upwardly with respect to the main disc holder body 200, and pushes against and deforms the pair of leaf springs 201. The floppy disc 80 is held in this state without play in the upward and downward directions.

In this case, the floppy disc 80 is positioned with respect to the front and rear directions of the apparatus 100 as the floppy disc 80 moves downwardly, since the front end of the case 81 is guided by the sloping portions 174a on the positioning parts 174 of the blocks 173. In addition, the floppy disc 80 is positioned with respect to the right and left directions of the apparatus 100 as the floppy disc 80 moves downwardly, because the projections 85 of the case 81 are guided by the sloping portions 175a on the positioning parts 175 of the blocks 173. Moreover, the front lower surface of the case 81 pushes an actuator of the switch 183 downwardly, so as to close the switch 183. Thus, the switch 183 detects that the floppy disc 80 has been loaded into the apparatus 100. On the other hand, the tab 87 at the left rear end of the floppy disc 80 pushes an actuator of the switch 184 downwards, so as to close the switch 184. As a result, the switch 184 detects that it is possible to record signals on the main disc body 82. In a case where the tab 87 has been removed, the switch 184 will not close, and the switch 184 will detect that signals cannot be recorded on the main disc body 82 in order to prevent an erroneous erasure of recorded signals.

Figure 20:
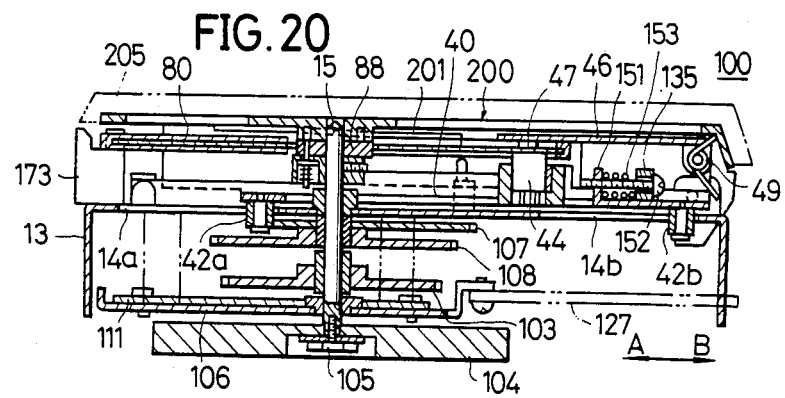
FIG. 20 shows a state where the disc holder has rotated downwardly in the apparatus shown in FIG. 19.

At the same time, the driving shaft 15 shown in FIG. 20 relatively passes through the hole 88a in the hub 88 of the main disc body 82, and fits within the hole 200d in the main disc holder 200. The disc table 17 also makes contact with the lower surface of the hub 88. Further, the head 44 makes contact with the lower surface of the main disc body 82, and the pad 47 of the pad support arm 46 makes contact with the upper surface of the main disc body 82 as in the first embodiment described previously.

The signals from the switches 183 and 184 are supplied to a central processing unit (not shown, and hereinafter simply referred to as a CPU) within the apparatus. When a start button (not shown) is pushed by manipulating a keyboard (not shown), a motor driving signal is produced from the CPU so as to drive the motor 39 for a short duration. As the motor 39 rotates, the driving shaft 15 and the disc table 17 start to rotate in the direction of the arrow C at a slow speed, based on the speed reduction rate a of the pulley 113, the gear pulley 114, and the gear 103 in the gear mechanism 109. Moreover, the engaging pin 25 engages with the engaging hole 88b in the hub 88.

Next, the motor 39 is started again, and the driving shaft 15 and the main disc body 82 start to rotate unitarily in the direction of the arrow C. At the same time, the cam plate 107 starts to rotate in the direction of the arrow D at an extremely slow speed. Then, as the guide roller 42a is pushed according to the peripheral shape of the cam plate 107, the carriage 40 slides in the direction of the arrow B.

Accordingly, the head 44 thereafter moves in the direction of the arrow B at an extremely slow speed, to record or reproduce signals with respect to the main disc body 82 which is rotating in the direction of the arrow C at a slow speed, on or from the spiral track 90 indicated by a one-dot chain line in FIG. 26 The recording or reproduction is actually started from a point when the carriage 40 slides slightly in the direction of the arrow A and the position detecting magnet 185 opposes the reed switch 128a of the first printed circuit 127 to close the reed switch 128a. An enable signal indicating that the recording or reproduction can be carried out, is produced from the reed switch 128a when the reed switch 128a closes.

When the recording or reproduction is carried out with respect to the main disc body 82 on or from the spiral track 90 from the outer periphery to the inner periphery of the main disc body 82 and the cam plate 107 undergoes approximately one revolution, the position detecting magnet 185 opposes the other reed switch 128b to close this reed switch 128b. As a result, a prohibit signal which prohibits the recording or reproduction, is produced from the reed switch 128b when the reed switch 128b closes, and the recording or reproduction is terminated.

In this state where the recording or reproduction is terminated, the guide roller 42a assumes a position 42a-1 shown in FIG. 26, and the guide roller 42a is in contact with the large diameter cam portion 107a3 of the cam plate 107. Moreover, the head 44 assumes a position 44-2 shown in FIG. 26. As the cam plate 107 continues to rotate, the guide roller 42a makes contact with and is guided by the sloping cam part 107c through the stepped cam part 107b, and reaches the parallel cam part 107d. Compared to the cam plate 19 in the first embodiment described previously, the cam plate 107 in the present embodiment is provided with the stepped cam part 107b and the sloping cam part 107c. Hence, a large portion of the returning stroke of the carriage 40 is carried out at a speed which is slower than the high speed, and the mechanical shock introduced when the carriage 40 undergoes the returning stroke is greatly reduced. As a result, the reliability of the apparatus 100 is improved. Furthermore, although the head 44 is in contact with the main disc body 82 as the carriage 40 undergoes the returning stroke, it is possible to prevent the premature wear of the head 44 by moving the carriage at the speed which is slower than the high speed.

Next, when extracting the floppy disc 80 from the apparatus 100, the push button 157 is pushed downwardly in FIG. 22 so as to rotate the eject lever 156 downwardly against the force exerted by the torsion spring 171. As a result, the projection 160 hits the frame 13, while the cam part 159 pushes the cam pin 159 of the engaging lever 165 downwardly. Accordingly, the engaging lever 165 rotates slightly clockwise in FIG. 22 against the force exerted by the torsion spring 171, and the engaging part 166 disengages from the engaging part 202 of the main disc holder body 200.

Figure 23:
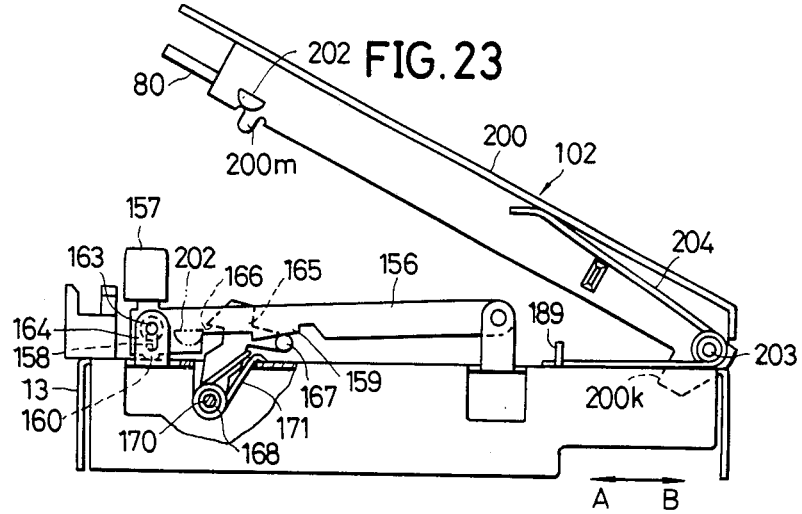

Consequently, the main disc holder body 200 rotationally returns upwardly as shown in FIG. 23 due to the action of the torsion spring 204. The main disc holder body 200 stops at a rotational position where the stopper plate parts 200k make contact with the edges of the respective openings 188. As the main disc holder 200 rotates upwardly, the pad support arm 46 also rotationally returns as shown in FIG. 19 due to the engagement of the engaging arm 46a and the engaging guide 200g. Hence, the floppy disc 80 which had been deforming the pair of leaf springs 201 moves downwardly within the main disc holder body 200 due to its own weight, and again makes contact with the disc holding part 200h. In this state, the floppy disc 80 can be extracted from the main disc holder body 200, by holding and extracting the floppy disc 80 toward the front of the apparatus 100. As the floppy disc 80 is moved upwardly together with the main disc holder body 200 which rotates upwardly, the switches 183 and 184 become open.

In FIG. 23, when the operator releases the push button 157 from the pushed state, the eject lever 156 and the engaging lever 165 rotationally return to the respective positions shown in FIG. 21 due to the action of the torsion spring 171.

The disc holder 102 further comprises a cover 205 which is fixed on top of the ceiling part 200a of the main disc holder body 200 as shown in FIGS. 13, 19, and 21. The cover 205 has a shape which is approximately the same as the shape of the ceiling part 200a, and has a rectangular hole 205a located at a position corresponding to the rectangular hole 200c in the ceiling part 200a. Thus, it is possible to visually check the label 89 on the floppy disc 80 through the rectangular holes 200c and 205a, even when the floppy disc 80 is inserted within the disc holder 102. The rectangular hole 200f in the main disc holder body 200 is useful for the following reasons. That is, during a manufacturing process before the cover 205 is mounted on top of the ceiling part 200a, it is possible to directly check through the rectangular hole 200f the operation of the pad support arm 46, the movement of the floppy disc 80, and the operations of the carriage 40 and the head 44 before the floppy disc 80 is inserted into the disc holder 102.

In the embodiments described heretofore, the head 44 is moved from the outer periphery to the inner periphery of the main disc body 82. However, the recording and/or reproducing apparatus may be designed to carry out the recording and/or reproduction as the head 44 moves from the inner periphery to the outer periphery of the main disc body 82.

The carriage 40 is guided by two holes in the guided part 51a with respect to the guide rod 52a, and is guided by one hole in the guided part 51b with respect to the guide rod 52b. In other words, the carriage 40 is guided at three points, and for this reason, the carriage 40 can be positively guided without play.

Further, the present invention is not limited to these embodiments, but various variations and modifications may be made without departing from the scope of the present invention.

What is claimed is:

1. A floppy disc recording and/or reproducing apparatus comprising:
   a driving shaft for rotationally driving a floppy disc;
   a cam body having a cam part;
   driving means for rotating said driving shaft and said cam body, said driving means comprising a single motor;
   rotation transmitting means for transmitting the rotation of said motor to said driving shaft so as to rotate said driving shaft at a predetermined rotational speed and for transmitting the rotation of said motor to said cam body so as to rotate said cam body;
   a pair of guide means arranged on a single imaginary line and disposed on opposite sides of said driving shaft;
   a carriage having a head for recording and/or reproducing signals on and/or from said floppy disc which is rotated by said driving shaft; and
   a pair of guided elements provided on said carriage, for linearly moving said carriage under guidance of said pair of guide means,
   one guided element of said pair of guided elements making contact with said cam part of said cam body and being displaced as said cam body rotates, so as to move said carriage continuously.

2. A recording and/or reproducing apparatus as claimed in claim 1 in which said rotation transmitting means rotates said cam body at a rotational speed which is slower than said predetermined rotational speed of said driving shaft.

3. A recording and/or reproducing apparatus as claimed in claim 1 in which said cam body rotates coaxially with said driving shaft but independently of said driving shaft.

4. A recording and/or reproducing apparatus as claimed in claim 3 in which said head is located on said carriage at a position lying on an imaginary line which connects said pair of guided elements, said position of said head is opposite to said one guided element with respect to said driving shaft, and said cam body and said driving shaft rotate in mutually opposite directions.

5. A recording and/or reproducing apparatus as claimed in claim 1 in which said cam part of said cam body is made up of a cam surface on an outer periphery of said cam body, and said recording and/or reproducing apparatus further comprises urging means for urging said carriage in a direction so that said one guided element is constantly pushed against the cam surface of said cam body.

6. A recording and/or reproducing apparatus as claimed in claim 5 which further comprises a frame and, in which said urging means comprises a coil spring which extends in a direction oblique to moving directions of said carriage between said carriage and said frame.

7. A recording and/or reproducing apparatus as claimed in claim 5 in which said cam surface of said cam body comprises a minimum diameter portion, a maximum diameter portion, an intermediate diameter portion connecting said minimum and maximum diameter portions and extending over a large angular range of said cam body, said intermediate diameter portion gradually and continuously increasing in its diameter from said minimum diameter portion to said maximum diameter portion, and a connecting portion connecting said maximum and minimum diameter portions and extending over a small angular range of said cam body.

8. A recording and/or reproducing apparatus as claimed in claim 7 in which said cam body is rotated at a constant rotational speed which is slower than the rotational speed of said driving shaft, and said intermediate diameter portion of said cam body has a shape to move said head at a constant speed by said one guided element as said cam body rotates.

9. A recording and/or reproducing apparatus as claimed in claim 7 in which said connecting portion of said cam surface comprises a first sloping portion which connects to said maximum diameter portion, a stepped portion which connects to said first sloping portion, a second sloping portion which connects to said stepped portion, and a parallel portion which connects to said second sloping portion and is parallel to moving directions of said pair of guided elements.

10. A recording and/or reproducing apparatus as claimed in claim 1 which further comprises a frame which is penetrated by said driving shaft, in which said pair of guide means are a pair of guide grooves formed on said frame.

11. A recording and/or reproducing apparatus as claimed in claim 1 which further comprises a frame, in which said rotation transmitting means comprises a gear mechanism made up of a plurality of gears, for transmitting the rotation of said motor to said driving shaft and said cam body at mutually different speed reduction rates, a first support plate for supporting said gear mechanism, and a second support plate for supporting said first support plate and being mounted on said frame, and said gears of said gear mechanism and said first support plate are made of materials having the same coefficient of thermal expansion.

12. A recording and/or reproducing apparatus as claimed in claim 11 in which said gears of said gear mechanism and said first support plate are made of the same resin.

13. A recording and/or reproducing apparatus as claimed in claim 11 which said first and second support plates are mutually engaged by a pin which loosely fits into one of said first and second support plates.

14. A recording and/or reproducing apparatus as claimed in claim 1 in which said driving shaft comprises a rotary shaft which is rotated by being transmitted of the rotation of said driving means, and a disc supporting member mounted on an upper end of said rotary shaft, and said floppy disc is placed onto said disc supporting member.

15. A recording and/or reproducing apparatus as claimed in claim 14 in which said disc supporting member has an engaging pin projecting from said disc supporting member, for engaging with a hole in said floppy disc, and said engaging pin is upwardly and downwardly movable.

16. A recording and/or reproducing apparatus as claimed in claim 1 which further comprises a pair of elongated guide members located on both sides of said carriage, each elongated guide member being arranged parallel to said single imaginary line on which said pair of guide means are arranged, in which said carriage has at least three guided parts which slidably engage with and are guided by said pair of elongated guide members.

17. A recording and/or reproducing apparatus as claimed in claim 1 in which said carriage has an opening through which said driving shaft penetrates, and said opening extends over a length corresponding to a moving range of said carriage.

18. A recording and/or reproducing apparatus as claimed in claim 1 in which said cam body and said carriage are made of a material having a coefficient of thermal expansion which is approximately the same as a coefficient of thermal expansion of a material making up said main floppy disc body.

19. A recording and/or reproducing apparatus as claimed in claim 19 in which said floppy disc is made of polyethylene terephthalate, and said cam body and said carriage are made of stainless steel.

20. A recording and/or reproducing apparatus as claimed in claim 1 in which said carriage comprises a main carriage body mounted with said pair of guided elements, a head holder mounted on said main carriage body, for holding said head, and adjusting means for adjusting a mounting position of said head holder with respect to said main carriage body.

21. A recording and/or reproducing apparatus as claimed in claim 20 in which said head holder has a rib part on a lower part thereof, said main carriage body has a grooved part for receiving said rib part of said head holder, and said adjusting means adjusts the mounting position of said head holder in a state where said rib part of said head holder is fitted into said grooved part of said main carriage body.

22. A recording and/or reproducing apparatus as claimed in claim 20 in which said head holder comprises a rectangular hole having projecting parts on two sides thereof, for receiving said head, a leaf spring disposed between said head and remaining two sides of said rectangular hole, and an adjusting screw for pushing said head in a direction so that said head makes contact with one of said projecting parts.

23. A recording and/or reproducing apparatus as claimed in claim 1 which further comprises a magnet provided on said carriage, and first and second reed switches, in which said first and second reed switches are respectively closed by said magnet when said head reaches a predetermined recording or reproducing position where a recording or reproduction is started and when said head reaches a predetermined terminal position where the recording or reproduction is terminated.

24. A recording and/or reproducing apparatus comprising:
a driving shaft for rotationally driving a floppy disc;
a cam body having a cam part;
driving means for rotating said driving shaft and said cam body independently of each other;
guide means arranged on a single imaginary line and disposed on opposite sides of said driving shaft;
a carriage having a head for recording and/or reproducing signals on and/or from said floppy disc which is rotated by said driving shaft; and
guided elements provided on said carriage, for linearly moving said carriage under guidance of said guide means,
one guided element of said guided elements being a roller which as a diameter r and makes contact with said cam part of said cam body, and being displaced as said cam body rotates so as to move said carriage continuously, said intermediate diameter portion of said cam body being designed so that a distance $R(\theta)$ between a center of rotation of said cam body and the peripheral surface of said cam body satisfies the following equation:

$$R(\theta)=[A(\theta)-r\cdot\cos\beta]/\cos\alpha(\theta)$$

where:
$R(\theta)$ is a distance between the center of rotation of said cam body and a point on the peripheral surface of said cam body where said one guided element makes contact;
$\theta$ is a total angle over which said cam body rotates from an initial state;
$A(\theta)$ is described by $A(\theta)=A_0+\theta P/\Delta\theta$, where $A_0$ is an initial value of $A(\theta)$ when said one guided element makes contact with said minimum diameter portion of said cam body, and P is a track pitch with which said head scans over said floppy disc, and
$\alpha(\theta)$ is described by $\alpha(\theta)=\tan^{-1}r\cdot\sin\beta/[A(\theta)-r\cdot\cos\beta]$, where $\beta$ is a constant angle between an imaginary line which connects centers of said roller and said cam body and an imaginary line which connects the center of said roller and a point where said roller makes contact with said cam body.

* * * * *

UNITED STATES PATENT AND TRADEMARK OFFICE
CERTIFICATE OF CORRECTION

PATENT NO. : 4,665,453            Page 1 of 2

DATED : May 12, 1987

INVENTOR(S) : MAKOTO MIKAMOTO, SHINKICHI SASAKI, ET AL

It is certified that error appears in the above-identified patent and that said Letters Patent is hereby corrected as shown below:

| | |
|---|---|
| Column 7, Line 7, | Begin a new paragraph with "A floppy disc 80 . . ." |
| Column 8, Line 46, | Cancel "9al" and substitute therefor---19al--- |
| Column 10, Line 63, | Cancel "$R(\theta).\cos\alpha(\theta) + r.\cos\alpha = A(\theta)$" and substitute therefor ---$R(\theta).\cos\alpha(\theta) + r.\cos\beta = A(\theta)$--- |
| Column 11, Line 16, | Cancel "$\tan\alpha(74)$" and substitute therefor---$\tan\alpha(\theta)$--- |
| Column 11, Line 21, | Cancel "$\alpha = \tan^{-1} r.\sin$ . . ." and substitute therefor---$\alpha = \tan^{-1} r.\sin$ . . .--- |
| Column 11, Line 52, | begin a new paragraph with "According to the apparatus 10," |
| Column 13, Line 28, | Cancel "mountin9" and substitute therefor---mounting--- |

UNITED STATES PATENT AND TRADEMARK OFFICE
CERTIFICATE OF CORRECTION

PATENT NO. : 4,665,453

DATED : May 12, 1987

INVENTOR(S) : MAKOTO MIKAMOTO, SHINKICHI SASAKI, ET AL

It is certified that error appears in the above-identified patent and that said Letters Patent is hereby corrected as shown below:

Column 18, Lines 5-8, Cancel italics" and substitute in regular print style.

Signed and Sealed this

Twenty-fifth Day of August, 1987

Attest:

DONALD J. QUIGG

Attesting Officer     Commissioner of Patents and Trademarks